United States Patent
Paul et al.

(10) Patent No.: US 9,286,045 B2
(45) Date of Patent: *Mar. 15, 2016

(54) METHOD AND SYSTEM FOR PROVIDING APPLICATIONS TO VARIOUS DEVICES

(75) Inventors: Sanjoy Paul, Bangalore (IN); Manish Jain, New Delhi (IN)

(73) Assignee: Infosys Limited (IN)

( * ) Notice: Subject to any disclaimer, the term of this patent is extended or adjusted under 35 U.S.C. 154(b) by 548 days.

This patent is subject to a terminal disclaimer.

(21) Appl. No.: 12/814,760

(22) Filed: Jun. 14, 2010

(65) Prior Publication Data

US 2011/0083069 A1    Apr. 7, 2011

Related U.S. Application Data

(63) Continuation-in-part of application No. 12/542,990, filed on Aug. 18, 2009.

(30) Foreign Application Priority Data

Aug. 18, 2008  (IN) ............................ 1990/CHE/2008
Nov. 30, 2009  (IN) ............................ 2943/CHE/2009

(51) Int. Cl.
*G06F 9/445*   (2006.01)
*H04N 21/462*   (2011.01)
*G06F 17/22*   (2006.01)
(Continued)

(52) U.S. Cl.
CPC .. *G06F 8/60* (2013.01); *G06F 8/64* (2013.01); *G06F 17/211* (2013.01); *G06F 17/212* (2013.01); *G06F 17/227* (2013.01); *G06F 17/2247* (2013.01); *G06F 17/2264* (2013.01);
(Continued)

(58) Field of Classification Search
CPC ............... G06F 8/64; G06F 8/60; G06F 8/71; G06F 17/211; G06F 17/212; G06F 17/227; G06F 17/2247; G06F 17/2264; G06F 17/24; G06F 17/3089; G06F 17/30873; H04N 5/44543; H04N 21/4622
USPC ......... 715/205, 243, 249–250, 716, 725, 760; 717/106, 116, 120–121
See application file for complete search history.

(56) References Cited

U.S. PATENT DOCUMENTS 7,428,725 B2 *  9/2008  Niyogi et al. ................. 717/109
7,774,746 B2    8/2010  Mansfield et al.
(Continued)

OTHER PUBLICATIONS

Sanjoy Paul and Manish Jain, "Convergence Gateway for a Multichannel Viewing Experience", Copyright 2008, published under Annual Review of Communications, vol. 61, presented by the International Engineering Consortium, pp. 20.*

(Continued)

*Primary Examiner* — Chau Nguyen
(74) *Attorney, Agent, or Firm* — Lerner, David, Littenberg, Krumholz & Mentlik, LLP

(57) ABSTRACT

A method for providing applications to one or more requesting devices is provided. The method comprises a step of first receiving an application request from the one or more requesting devices. The method includes extracting details of the request. Further markup language structure for corresponding page of the application is generated. The markup language structure is generated based by invoking page handlers which includes contacting business logic layer to get information required to be embedded in the corresponding page. The output page is then provided to the requesting device.

21 Claims, 22 Drawing Sheets

(51) Int. Cl.
*G06F 17/30* (2006.01)
*G06F 17/21* (2006.01)
*H04N 5/445* (2011.01)

(52) U.S. Cl.
CPC ........ *G06F 17/3089* (2013.01); *H04N 5/44543* (2013.01); *H04N 21/4622* (2013.01)

(56) References Cited

U.S. PATENT DOCUMENTS

| | | | |
|---|---|---|---|
| 8,645,390 B1* | 2/2014 | Oztekin et al. | 707/748 |
| 2001/0052910 A1 | 12/2001 | Parekh et al. | |
| 2003/0050931 A1 | 3/2003 | Harman et al. | |
| 2003/0108022 A1 | 6/2003 | Yamamoto | |
| 2003/0110234 A1* | 6/2003 | Egli et al. | 709/217 |
| 2003/0167277 A1* | 9/2003 | Hejlsberg et al. | 707/102 |
| 2003/0172368 A1 | 9/2003 | Alumbaugh et al. | |
| 2004/0049574 A1* | 3/2004 | Watson et al. | 709/224 |
| 2006/0200761 A1* | 9/2006 | Judd et al. | 715/517 |
| 2007/0083810 A1 | 4/2007 | Scott et al. | |
| 2007/0088681 A1 | 4/2007 | Aravamudan et al. | |
| 2007/0204216 A1* | 8/2007 | Morgan | 715/517 |
| 2008/0026793 A1 | 1/2008 | Teegan et al. | |
| 2008/0281810 A1* | 11/2008 | Smyth et al. | 707/5 |
| 2009/0024403 A1 | 1/2009 | Servian et al. | |
| 2009/0213081 A1 | 8/2009 | Case, Jr. | |
| 2009/0249242 A1 | 10/2009 | White | |

OTHER PUBLICATIONS

Zimmerman et al., Chapter 5—TV Personalization System—Design of a TV Show Recommender Engine and Interface, Apr. 12, 2004, Carnegie Mellon University, pp. 29.*

Yu et al., "TV program recommendation for multiple viewers based on user profile merging", Jun. 10, 2006 © Springer Science + Business Media B.V. 2006, pp. 20.*

Butler et al., "Device Independence and the Web", Oct. 2, 2002, IEEE Internet Computing, pp. 11.*

\* cited by examiner

METHOD AND SYSTEM FOR PROVIDING APPLICATIONS TO VARIOUS DEVICES

CROSS-REFERENCE TO RELATED APPLICATIONS

This application is a continuation-in-part of U.S. application Ser. No. 12/542,990, filed on Aug. 18, 2009, the disclosure of which is incorporated herein by reference.

BACKGROUND OF THE INVENTION

The present invention relates to the field of providing applications to various devices. More particularly, the present invention provides transformation of applications based on type of device requesting an application.

With the advent of technology, information is now readily accessible via various resources. A significant resource that is widely used for accessing information is the Internet. The Internet was earlier accessed only using a personal computer, with a good processing speed and a relatively large display size. Over the past few years, technologists and business organizations have realized the need for people to stay connected with the rest of the world through various portable devices that are available with them. One of the methods for ensuring real time information access using portable devices is providing for internet access through mobile phones.

Communication Service Providers (CSPs) are transforming their network and service infrastructure to provide "quadruple play" (voice, video, data and mobile) services to subscribers of mobile services. To monetize on their investments in infrastructure, CSPs today need applications to retain their subscriber base and also to attract new subscribers. Over the years, applications that have transformed people's lives started out as web-based applications. For example, web-based applications such as e-commerce applications, applications for hosting auctions, video sharing applications and social networking applications have their roots in the Internet. Developing and deploying new applications for computers is relatively easier compared to doing the same for mobile and/or television networks. The main reason is that access to Mobile and Television networks is very tightly controlled by the service provider and the technology to deliver a similar experience is not yet matured.

When an application becomes successful on the web, the CSPs who own the mobile and television networks (as part of their quadruple play) would like to provide a similar application on their mobile and television networks as well, but with few targeted features. In addition to replicating the web applications, CSPs would also like to provide newer categories of applications specific to TV and Mobile. For example, RSS feeds of important news from various websites, storefront to purchase video, social networking etc. By doing this, telecom operators would be able to exploit the convergence in access technology by giving their subscribers option to access various applications from computer while at office, mobile phones during transit, and TV while at home and also provide differentiated user experience for each type of application.

In some scenarios, an application may be requested by disparate devices having different operating platforms and user interfaces. Depending on the type of device requesting the application, the application may be customized for specific platforms, such as, mobile and television platforms. This approach is likely to have good quality because applications are developed from scratch keeping the requirements and constraints of the platforms on which they would be deployed, in mind. However, such an approach is quite expensive in terms of skilled resources which are required and in terms of time it would take to reach the market.

Consequently, there is a need for a method and a system that provides similar applications to various devices with minimal human intervention. Further there is a need to reduce the cost and delay in providing applications to users of devices.

BRIEF SUMMARY OF THE INVENTION

A method and system for providing applications to one or more requesting devices is provided.

The system for providing applications to one or more requesting devices includes a development framework, an execution framework, an application adaptor and a media transformation engine. The development framework is configured to facilitate generation of software code for rendering the application on the one or more requesting devices. The execution framework is configured to transform navigational and user interface related aspects of the requested application and the application adaptor is configured to generate a Markup Language structure for a page corresponding to the application. The media transformation engine in the system is configured to provide media content requested by the application to the one or more requesting devices. The execution framework is further configured to provide one or more output pages corresponding to the application to the one or more requesting devices. In an embodiment of the present invention, the markup language used for generating the page corresponding to the application is Extensible Markup Language (XML). In an embodiment of the present invention, the system is deployed on a server as part of the requested application. In another embodiment of the present invention, the system is deployed on a server and located external to the requested application.

In an embodiment of the preset invention, the development framework is configured to facilitate generation of markup language code for rendering the application on various kinds of devices such as televisions, mobile devices, personal computers. The markup language code corresponding to a device comprises user interface layout data for rendering the application on to the device.

In an embodiment of the present invention, the development framework includes an Application Programming Interface (API) for a developer to generate the software code for rendering the application on the various requesting devices.

In various embodiments of the present invention, the application requested by a device is at least one of a web-based application, a television based application, a mobile application and a gaming application.

In an embodiment of the present invention, the requesting device may request the application through a data network. The data network may be at least one of the Internet, an Intranet and a network of two or more electronic devices.

In an embodiment of the present invention, the execution framework includes a controller configured to extract details of the application request and a request handler configured to identify the applications Adapter Class to be invoked and further configured to instantiate the Class. The execution framework further includes a device capabilities module configured to get information about capabilities of the requesting device and a device adapter configured to adapt the application to the requesting device. In an embodiment of the present invention, the capabilities comprises at least one of screen size of the requesting device, type of audio and video formats used, multimedia container formats and screen display resolution. The execution framework further includes a data transformer configured to generate output page corresponding to the application in at least one of an HTML and an XHTML format. The output page is generated based on the XML page generated by the application adaptor. For providing the output page to the requesting device, the system includes a response handler. The response handler is further configured to receive XML structure of the output page in string format along with information required to transform user interface from the controller and further configured to pass the received information to the data transformer.

In an embodiment of the present invention, the media content requested by the application includes at least one of images, video and audio.

In various embodiments of the present invention, the media transformation engine includes a media controller configured to deliver request for media content to a media handler and the media handler is configured to check whether a transformed version of requested content is available in a media cache. The media transformation engine further includes a media transcoder configured to transform content from a shared storage in order to conform the content in accordance with requirements of the requesting device.

In an embodiment of the present invention, the media transformation engine further includes a customer profile module configured to track access information and receive user preferences and usage information based on one or more requests received. The media transformation engine further includes a real time analysis module configured to receive the user preferences and usage information from the user profile module and further configured to construct content data most likely to be requested based on usage information. The engine also includes a content provider configured to store content data in accordance with one or more device-specific formats.

In various embodiments of the present invention, the system for providing applications to one or more requesting devices further includes a media cache configured to store frequently requested content transformed in accordance with requirements of standard devices and a shared storage configured to store standard untransformed content, wherein the media transcoder utilizes data from shared storage in order to conform the content in accordance with requirements of the requesting device.

In an embodiment of the present invention, the system for providing an application to one or more requesting devices comprises a software platform configured to provide an application specific to the device requesting the application. Further, the system comprises an applications module configured to store one or more software applications and an adaptive application and feature configuration system configured to provide features contextually relevant to the requesting device and user profile of subscriber requesting the application. In an exemplary embodiment of the present invention, the one or more software applications comprises at least one of a banking application, a gaming application and an e-commerce application.

In various embodiments of the present invention, the system further comprises an application programming interface configured to define a set of configuration files. In an embodiment of the present invention, the set of configuration files comprises one or more configuration files for storing Adapter classes of one or more software applications, storing response entries for pagination details and invoking page handlers for generating XML structure of corresponding page of the requested application. In an embodiment of the present invention, the one or more configuration files comprises the files: application.properties, context.xml, RequestConfig.xml and ResponseConfig.xml files.

In an embodiment of the present invention, the application.properties file is configured to store the requested applications' Adapter class. In another embodiment of the present invention, the context.xml file is configured to store application-specific data source information. The RequestConfig.xml file may be configured to define each page entry corresponding to a requested application along with parameters to be passed along with page request to the applications' Adapter class. The ResponseConfig.xml file is configured to store response entries for pagination details corresponding to the requested application.

In an embodiment of the present invention, the software platform comprises a media transformation engine configured to provide media content requested by the application. The media transformation engine comprises a media request servlet configured to receive media request and process media request parameters. Further, the media transformation engine comprises a media handler configured to receive details of media request from the media request servlet. Moreover, the media transformation engine comprises a device capability handler configured to receive media request from the media handler and a device capability database configured to store one or more device types and data of media supported by the one or more device types.

In an embodiment of the present invention, the requesting device is at least one of a mobile device, a set top box, a personal digital assistant, Internet Protocol Television (IPTV), OpenCable Application Platform (OCAP)-based cable television, Enhanced TV Binary Interchange Format (EBIF)-based cable television, Digital Television (DTV), and any computing device.

In various embodiments of the present invention, the development framework for generating software code for rendering the application on various requesting devices includes a user interface transformer configured to store markup language templates defining user interface layout data for rendering data on to the one or more requesting devices and a rules engine configured to facilitate the creation of markup language templates for the one or more requesting devices.

In an embodiment of the present invention, the markup language templates are created by a developer using an application programming interface. In an example, the markup language is an Extensible Markup Language (XML).

The method for providing applications to one or more requesting devices includes a first step of receiving an application request from the one or more requesting devices.

In an embodiment of the present invention, details of the requesting device are extracted from the request. The method further includes a step of generating Extensible Markup Language structure for corresponding page of the application. In an embodiment, the output page is in at least one of a Hypertext Markup Language format and an Extensible Hypertext Markup Language format. The output page is then provided to the requesting device.

In an embodiment of the present invention, the step of generating Extensible Markup Language structure for corresponding page includes obtaining information about capabilities of the requesting device from a database. The capabilities include screen size of the requesting device. Further, the applications' Adaptor Class to be invoked is identified and the Class is instantiated. Thereafter, page handlers are invoked to generate Extensible Markup Language structure for the corresponding page. In an embodiment, invoking page handlers comprises contacting business logic layer to get information required to be embedded in the corresponding page.

In an embodiment of the present invention, generating an output page corresponding to the application comprises using raw XML string along with details required to transform user interface to generate the page in at least one of an HTML and XHTML format, wherein the details include style sheets and transformation logic.

In an embodiment of the present invention, providing media content to the requesting device comprises the steps of sending a request for media content to a media controller, obtaining information about capabilities of the requesting device, checking whether media content in desired format is available in media cache based on capabilities of the requesting device, extracting Uniform Resource Identifier (URI) corresponding to the media content, if the media content is available in the media cache and providing the URI to the requesting device.

In an embodiment of the present invention, if the media content is not available in desired format in media cache, media content is first fetched from shared storage database. Thereafter, media content is transcoded in a format supported by the requesting device and the media content is stored in the media cache. Thereafter, URI corresponding to the transcoded media content is provided to the requesting device.

BRIEF DESCRIPTION OF THE DRAWINGS

The present invention is described by way of embodiments illustrated in the accompanying drawings wherein.

DETAILED DESCRIPTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
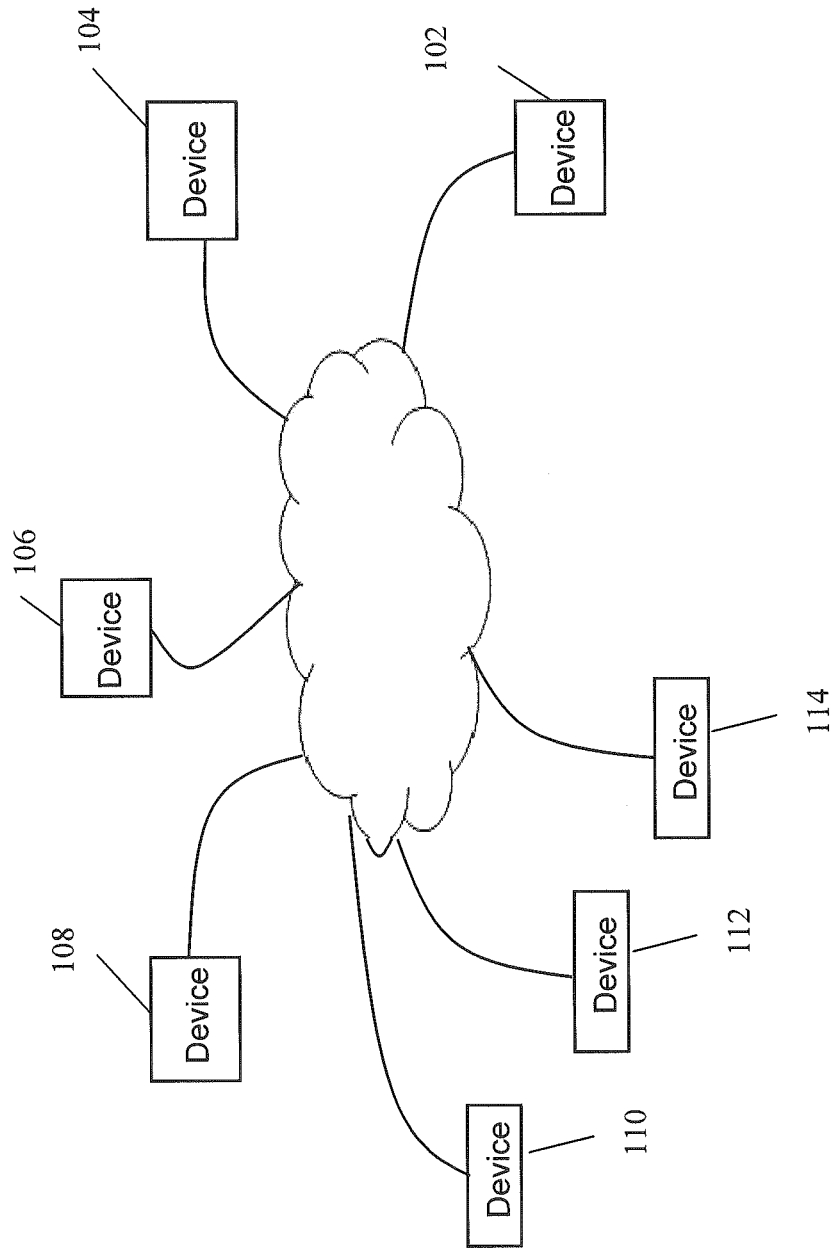
FIG. 1 illustrates an exemplary data network in accordance with an embodiment of the present invention.

FIG. 1 illustrates an exemplary data network in accordance with an embodiment of the present invention. The data network 100 comprises a first device 102 and a second device 104 in communication with the data network 100. In an embodiment of the present invention, a data network may be the Internet, an Intranet, a network of two or more electronic devices and the like. Examples of devices in the data network include, but are not limited to, mobile phones, laptops, computers, televisions such as Internet Protocol Television (IPTV), OpenCable Application Platform (OCAP)-based cable television, Enhanced TV Binary Interchange Format (EBIF)-based cable television, Digital Television (DTV) television, Direct to Home (DTH) television, a television attached to a set top box, or any other electronic device. In an embodiment of the present invention, a user, via the first device 102 sends a request to the data network 100 for an application which he wants to access. Examples of a requested application may be a web-based application, a television-based application, a mobile application etc.

An example of the web-based application may include, but is not limited to, a banking service, a movie rental service, a news update service, a social networking application etc. In various embodiments of the present invention, when the second device 104 sends a request for the same application to the data network 100 as requested by the first device, the data network 100 refrains from sending exact interface or data to the device 104, as it won't be rendered. Suitable changes are made to the navigational aspects, user interface and content of the application in order to render it on to the second device 104. Similarly, in various embodiments of the present invention, when a request is made by different devices for a television-based application, suitable changes may be required to be made for rendering the application on different devices. A method and system for applying changes or transformations to applications for providing them to different devices is explained in conjunction with the description of subsequent figures.

Figure 2:
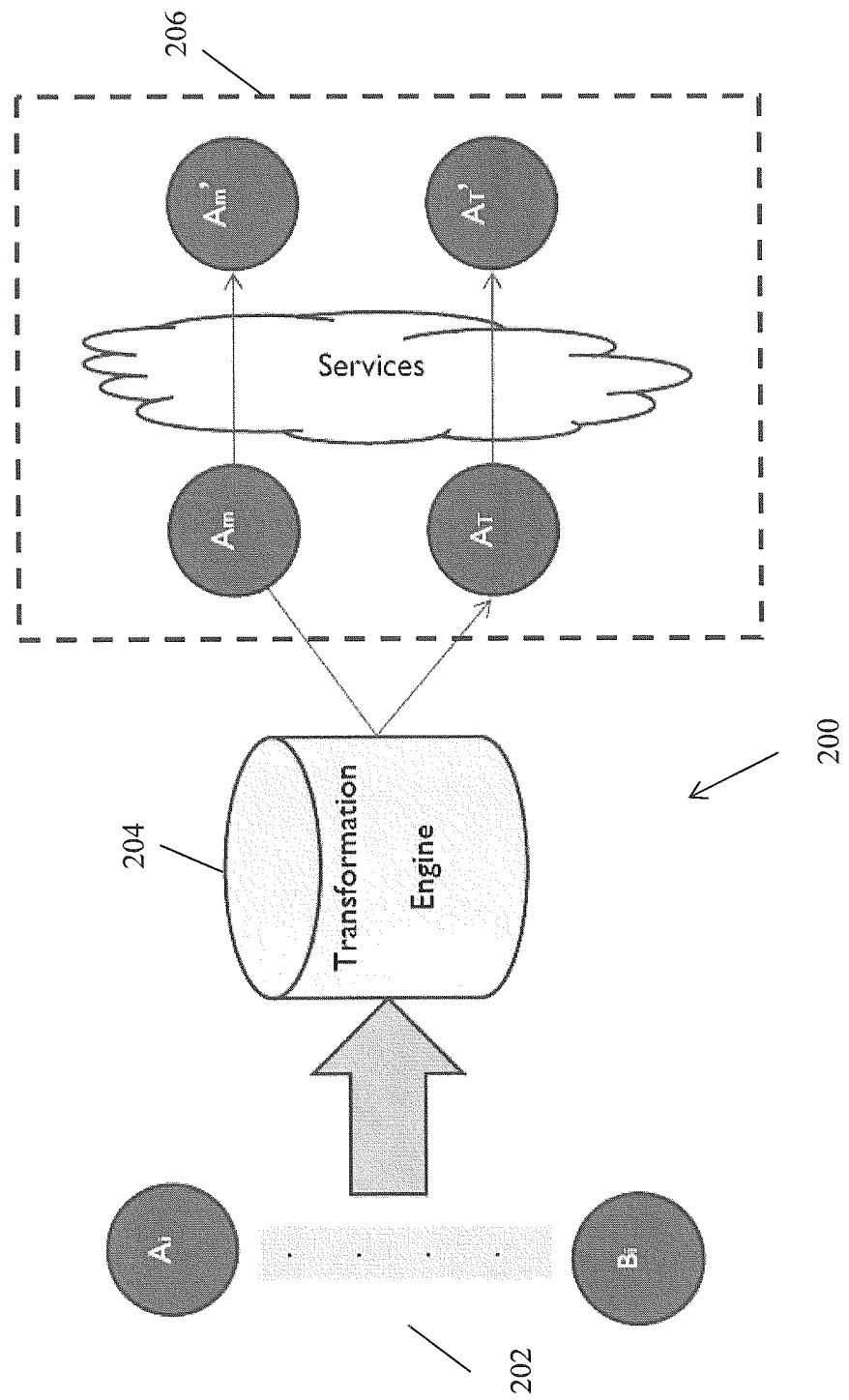
FIG. 2 illustrates basic architecture of a system for providing applications to various devices, in accordance with an embodiment of the present invention.

FIG. 2 illustrates a basic architecture of a system for providing applications to various devices in an exemplary data network (FIG. 1), in accordance with an embodiment of the present invention. The system 200 comprises a host of applications 202, a transformation engine 204, and a set of transformed applications 206.

The host of applications 202 include applications (Ai to Bi) developed for access from any computing or data processing device. In an embodiment of the present invention, the application is a web-based application. In an embodiment of the present invention, a request for accessing a first application Ai may be sent from a device, such as a mobile phone to the data network (FIG. 1). The transformation engine 204 transforms the first application to fit the requirements of the mobile phone. The transformed application is denoted as Am. In another embodiment of the present invention, if a request for accessing a second application Bi is sent from a device, say a television, to the data network (FIG. 1), the transformation engine 204 transforms the second application into a transformed application denoted as At. In various embodiments of the present invention, the transformation performed by the transformation engine 204 may not be 100% accurate and would require some fine tuning with manual intervention to suit specific requirements of a user of the device that sent the request. In an embodiment of the present invention, the transformed applications Am and At are further transformed with manual intervention into Am' and At'. In various embodiments of the present invention, Ai is an application developed for the Internet. Am and At are the "raw" transformed applications for mobile and television respectively. Am' and At' are the enhanced transformed applications for mobile and television respectively.

Figure 3:
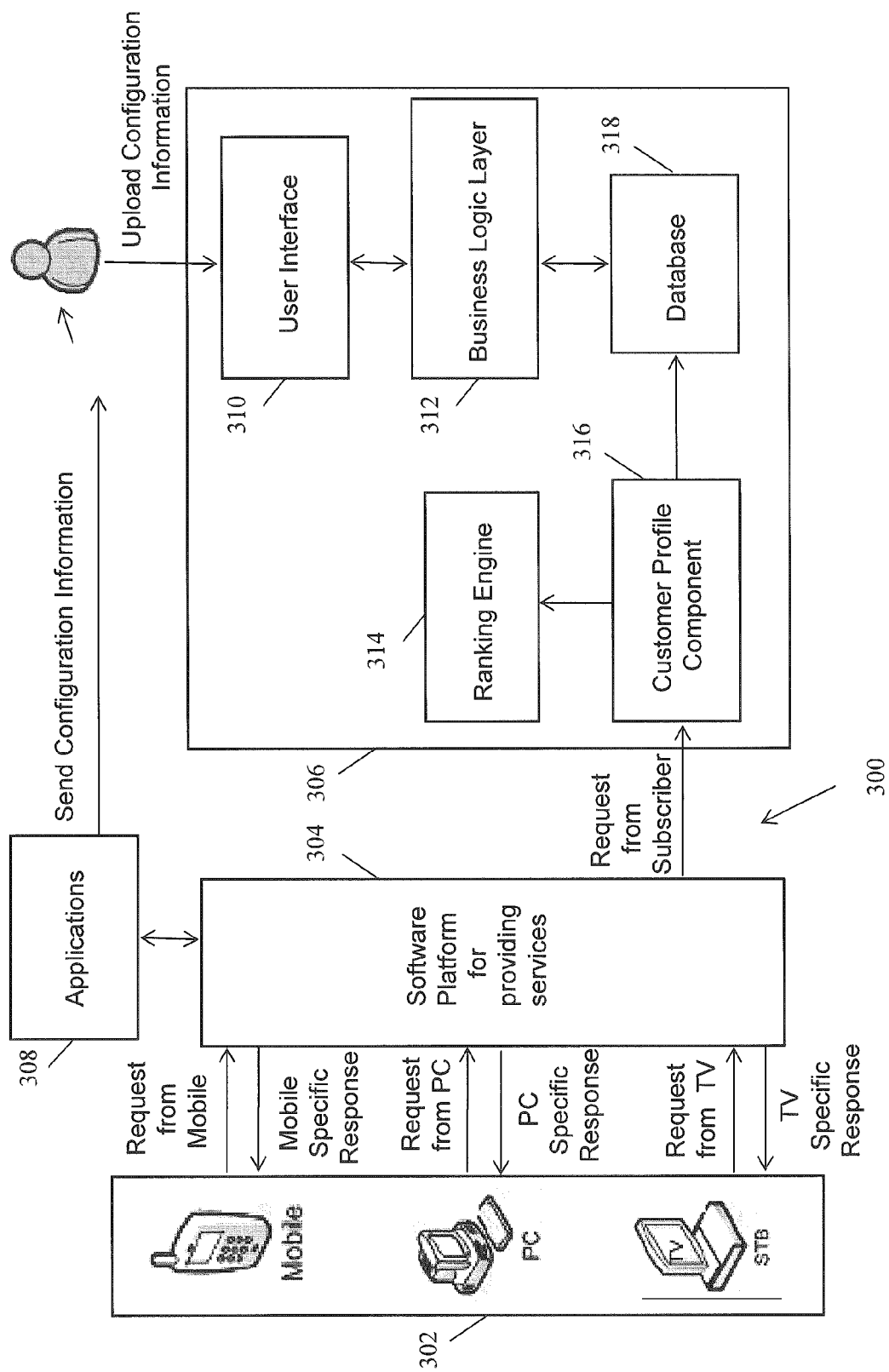
FIG. 3 illustrates a system for providing applications to various devices implementing configuration control based on requesting devices, in accordance with an embodiment of the present invention.

FIG. 3 illustrates a system 300 for providing applications to various devices implementing configuration control based on requesting devices, in accordance with an embodiment of the present invention. The system 300 comprises a customer domain 302, a software platform for providing services 304, an adaptive application and feature configuration system 306 and an applications module 308. The adaptive application and feature configuration system 306 comprises a user interface 310, a business logic layer 312, a ranking engine 314, a customer profile component module 316 and a database 318. The customer domain 302 comprises the devices used by a customer for sending request for applications. Examples of applications may include a banking application, a video store application, a gaming application, an e-commerce application etc. In the exemplary embodiment of FIG. 3, the customer domain 302 comprises the devices: Mobile, Personal Computer (PC) and Set Top Box (STB)/Television (TV). In various embodiments of the present invention, the software platform for providing services 304 provides a response specific to the device requesting the application. In an example, providing a response specific to the device requesting the application includes adapting the application according to specific configuration of the requesting device which may include type of video and audio formats used by the requesting device, multimedia container formats, screen size, screen display resolution etc.

In various embodiments of the present invention, the software platform 304 provides contextually relevant user experience based on the device requesting the application and the user profile of the subscriber. It interacts with the adaptive application and feature configuration system 306 to provide features contextually relevant to the requesting device and the subscriber requesting the application. Additionally, an administrator uses the adaptive application and feature configuration system 306 to configure which applications to show on which devices. An example of providing contextually relevant features includes adapting a particular feature only for a particular device, such as, in case of a banking application, the "bill pay" feature may be activated only for users of Mobile phones and not for Set Top Box (STB) users. Another example of providing contextually relevant features includes activating certain social networking features such as poking only for premium customers using PCs. An example of providing contextually relevant features based on user profile of a subscriber includes providing a customized interface for a sports or a food enthusiast.

The user interface 310 is used by an administrator to upload configuration information related to an application. In various embodiments of the present invention, the configuration information is received by the administrator from the applications module 308. The configuration information comprises: features of an application compatible with the type of requesting device, and information regarding what features should be shown on what device and what screen. For example, configuration information for a "video store" application includes unique information for displaying the application using a mobile browser, an IPTV browser and the like. In an embodiment of the present invention, an application sends configuration information in an Extensible Markup Language (XML) file to the administrator. In another embodiment of the present invention, the application owner can send an Excel sheet to the administrator who can manually enter information pertaining to each feature of the application using the user interface 310. In various embodiments of the present invention, the user interface can be used to manage the configuration information, such as, import and export information, add, view, delete, modify configuration, and trigger fetch subscriber usage information. The feature information is then saved in the database 318 using the business logic layer 312. The business logic layer 312 contains logic to save and retrieve configuration information to and from the database. The customer profile component module 316 is configured to populate the database with static information pertaining to subscriber profile, such as subscriptions, and dynamic information as provided by the software platform 304. The static information and dynamic information is then utilized to provide contextually relevant features to the requesting device. In an example, static information includes request URL's from a browser, channel viewing history, SMS requests etc. The dynamic information includes information relevant to a request sent by a subscriber that is used for determining the features for rendering the application on a particular device and screen. In an embodiment of the present invention, the request sent by a subscriber is received by the customer profile component module 316 and is then stored in the database 318.

The ranking engine 314 is a software module configured to provide a means for analyzing requests from a subscriber and determining the personalization level of the user interface for a subscriber. In an embodiment of the present invention, the ranking engine 314 analyzes static information pertaining to each request stored in the database 318. The ranking engine 314 analyzes the request and fetches the request into different interest areas and assigns interest level of subscribers to each area, wherein the interest level is defined as a rank. Based upon the ranking, personalization level used when defining user interface for a subscriber is determined.

An example of assigning ranks based on request information is illustrated by the table below:

| Subscriber ID | Sports | Food | Travel | Movies | Technology |
|---|---|---|---|---|---|
| 5 | 4 | 0 | 0 | 0 | 0 |
| 8 | 0 | 2 | 0 | 1 | 0 |
| 10 | 1 | 0 | 2 | 0 | 1 |

In an example, if a subscriber with subscriber ID 5 watches "Olympic Finals of Men's Singles Badminton Match" video on TV, requests for Cricket and Football scores by sending SMS to a number XXX from his mobile device, and browses www.espn.com from his PC to read about US open tennis scores, all within a day (24 hours), the interest level (ranking) for such a subscriber would be 4. In another example, if a subscriber with subscriber ID 8 watches movies on TV, requests for recipes from his TV, and requests for location of nearest Italian restaurant by sending SMS to a number XXX from his mobile device, all within a day (24 hours), the interest level (rank) for such a subscriber would be as shown in the table above. In yet another example, for a subscriber with subscriber ID 10, requests for latest travel deals to Bahamas from his TV, searches for hotels on the Internet from his PC, watches video recording of "Chelsea vs Arsenal" football match played last night from his TV, browses the Internet for technology news, all within a day (24 hours), the interest level (rank) for such a subscriber would be as shown in the table above.

In an embodiment of the present invention, personalization level used for defining user interface for a subscriber is determined as follows: In an example, Rank=2 corresponding to a topic, such as, 'Sports' may imply that the subscriber is interested in the topic and can be targeted for buying subscription to a package containing more information on the topic. In another example, Rank=3 may imply that in addition to everything that can be done for Rank=2, reorder features and applications so as to ease the subscriber's access. In yet another example, Rank=4 may imply that in addition to everything that can be done for Rank=3, brand the subscriber as having passion for information relating to a certain topic and the user experience should be defined in a manner that makes the person access related information with least possible browsing.

In various embodiments of the present invention, the ranking engine 314 analyzes dynamic information related to a subscriber request and updates the rank of the request. In an example, the ranking engine 314 uses keyword based search to find requests from a subscriber corresponding to a particular interest area. Based upon the search results, it adjusts the rank of the subscriber for that particular area. After ranking of a request is adjusted by the ranking engine 314 the configuration information corresponding to the request is stored in the database 318 and the configuration information is then retrieved by the software platform 304. The software platform 304 then provides the request to the requesting device based on the configuration information.

Figure 4:
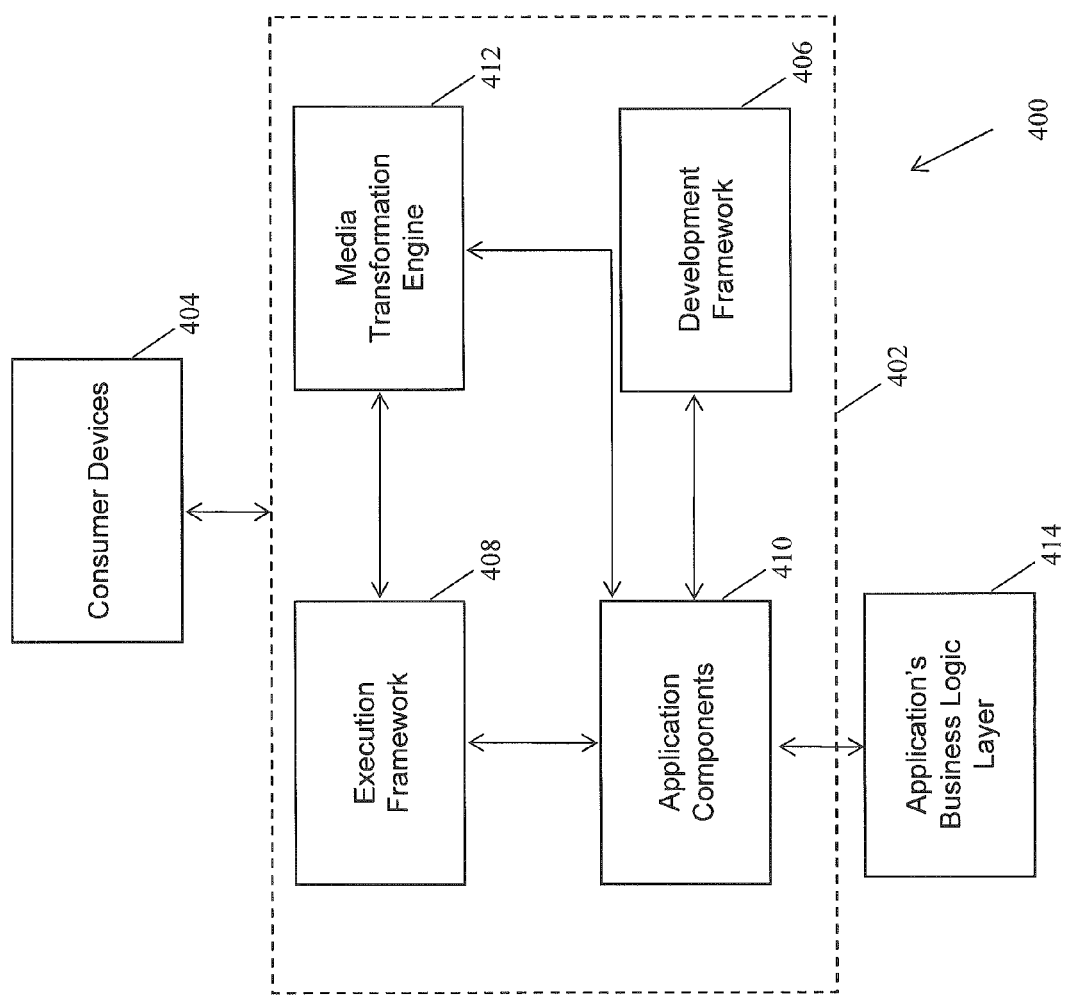
FIG. 4 illustrates an architecture of a system for facilitating rendering of applications on different types of devices.

FIG. 4 illustrates an architecture 402 of the system 400 for facilitating rendering of application on different types of devices. In an embodiment of the present invention, the architecture 402 facilitates rendering of applications onto the devices in the consumer devices module 404. Examples of devices in the consumer devices module 404 include a gamut of devices capable of requesting access to applications and providing for rendering of applications such as mobile phone, television etc. Examples of applications include, but are not limited to, a web-based application, a mobile-based application, a television-based application, a gaming application etc.

The architecture 402 comprises a development framework 406, an execution framework 408, an application components module 410, and a media transformation engine 412. In an embodiment of the present invention, the development framework 406 comprises components for developing and storing markup language templates for rendering applications on to various devices. In an embodiment of the present invention, the templates are defined in Extensible Markup Language (XML). In various embodiments of the present invention, the XML templates are defined by a developer using an application programming interface. The XML templates may be stored in a repository in a file system.

The execution framework 408 is responsible for receiving an application request, determining a type of device based on the request and selecting an XML template. Further, the execution framework 408 in conjunction with the application components module 410 generates an XML structure of a page corresponding to the application. The application components module 410 is responsible for invoking page handlers for generating the XML structure of the page.

In an embodiment of the present invention, the page handlers (not shown) contacts an Application's Business Logic Layer 414 to obtain information required to be embedded in the page.

In various embodiments of the present invention, the execution framework 408 generates an output page which is rendered on to the requesting device.

In an embodiment of the present invention, a request for an application from a device may include request for media content. The execution framework 408 passes request for media content to the media transformation engine 412 which provides media content to the requesting device.

Figure 5:
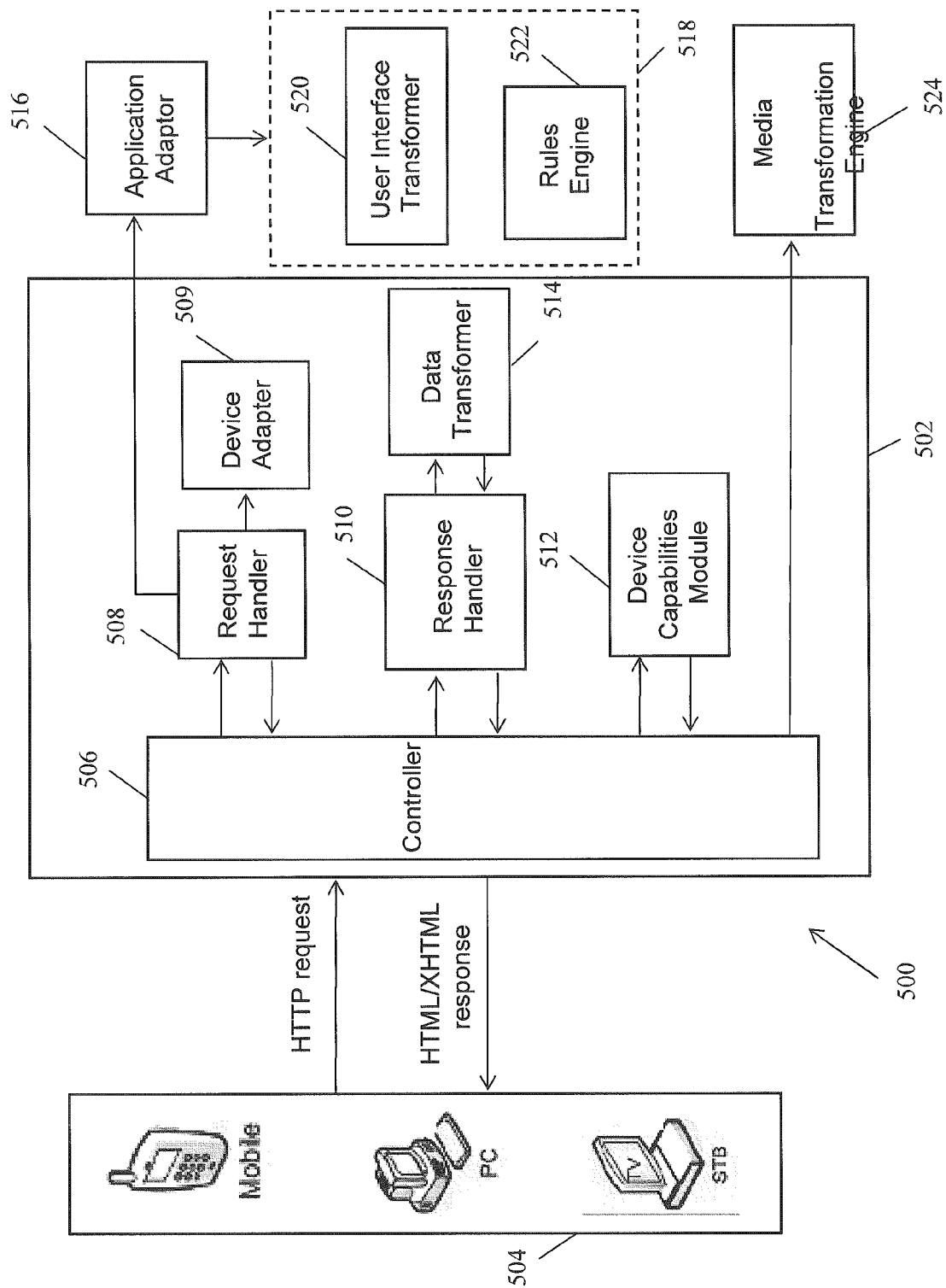
FIG. 5 illustrates a logical architecture of a system for providing applications to devices, in accordance with an embodiment of the present invention.

FIG. 5 illustrates a logical architecture of a system 502 for providing applications to devices, including the architecture of execution framework, in accordance with an embodiment of the present invention. The system 502 comprises the following components for providing the applications to devices in a device hosting module 504: an execution framework comprising a controller 506, a request handler 508, a device adapter 509, a response handler 510, a device capabilities module 512, and a data transformer 514. Further, the system 502 includes an application adaptor 516, a development framework 518 comprising a user interface transformer 520 and a rules engine 522, and a media transformation engine 524. In an embodiment of the present invention, the applications may include various web-based applications, mobile applications, applications for rendering on a television, a gaming application or any application for rendering on an electronic device having a user interface. In an embodiment of the present invention, the device hosting module 504 is connected to the system 502 through a data network (FIG. 1), as described in conjunction with the description of FIG. 1. As shown in FIG. 5, the device hosting module 504 may include devices such as, a mobile phone, a personal computer, a television, and the like. In an embodiment of the present invention, a device, such as a mobile phone may request access to an application in the data network (FIG. 1). In another embodiment of the present invention, device such as television may request for an access to mobile application or web application. In yet another embodiment of the present invention, a personal computer or laptop may request for an access to a mobile application or a television application.

In various embodiments of the present invention, a user accesses a web-based application by entering a URL in a browser of the requesting device. In an embodiment of the present invention, the requesting device may include devices such as, a personal computer, a television, a mobile phone, a personal digital assistant, a blackberry and the like having standards based browser for rendering a Hypertext Markup language (HTML) or Extensible Hypertext Markup Language (XHTML) application on the requesting device. The request is received by a web/application server that is front ending the application environment. In various embodiments of the present invention, the controller 406 in the system 402 receives the request for the web-based application from the web/application server. Thereafter, the controller 406 extracts details of the web-based application request.

Further, the controller 506 transfers the request to the device capabilities module 512. Information about capabilities of various standard devices is stored in a database which is accessed by the device capabilities module 512. In an example, capabilities of a device include capabilities related to aspect ratio, display resolution, available media players etc. and the capabilities of the browser/interpreter on the device such as support for JavaScript, media types, fonts etc. In an embodiment of the present invention, the device capabilities module 512 gets information about capabilities of the requesting device and sends the information back to the controller 506. Then, the controller 506 passes the request information to the request handler 508.

In various embodiments of the present invention, the development framework 518 is configured to generate XML templates of standard applications. The XML templates are generated by applying rules stored in the rules engine 522. In an embodiment of the present invention, an HTML file of a standard application is converted to an Extensible Markup Language (XML) file using rules stored in the rules engine 522. A standard template is a layout generated for a specific category of applications. In an embodiment of the present invention, typical web-based applications are classified into categories and for each category a standard "template" is generated. Examples of categories may include, but are not limited to, application categories such as, banking, video store, social networking, local updates and the like. Further, the user interface transformer 520 comprises XML templates defining user interface layout data for rendering data onto devices such as television, mobile device etc. The XML templates corresponding to standard application categories and device-specific templates are stored in a repository in the file system.

The request handler 508 accesses the application adaptor 516 to identify the applications adapter class to be invoked and then instantiates the class. The application adaptor 516 further invokes page handlers to generate Extensible Markup Language (XML) structure for a corresponding page of the application. In an embodiment of the present invention, the page handlers are stored as configuration files. A page handler facilitates transformation of format of the web-based application to suit the type of the device requesting the web-based application. The page handlers utilize XML templates corresponding to standard application categories and device-specific templates stored in a repository in the file system for generating Extensible Markup Language (XML) structure for a corresponding page of the application. In an embodiment of the present invention, the page handlers contacts Business Logic Layer to get information required to be embedded in the page.

In an embodiment of the present invention, a device in the device hosting module 504, such as a television, may request access to a web-based application, such as a gaming application, that requires an input mechanism, such as, a QWERTY keyboard. The application adaptor 516 therefore performs navigational transformation and facilitates a virtual keyboard to be displayed on the television screen. The virtual keyboard enables the user of the television to enter input on the web-based application by using a television remote. The application adaptor 516 modifies the XML file of the requested application with user interface layout data of the television for adapting user interface of the application to suit requirements of the television. In an embodiment of the present invention, the application adaptor 516 uses information about capabilities of the requesting device (television) for generating an XML file for the requested application.

In an embodiment of the present invention, the application adaptor 516 sends back the XML file to the request handler 508. Thereafter, the request handler 508 sends the XML string received from the application adaptor 516 to the controller 506. The controller passes the raw XML string along with information required to transform the user interface to the response handler 510. In an example, the information required to transform user interface includes style sheets and transformation logic.

Further, the response handler 510 passes information to the Data Transformer 514. Thereafter, the data transformer 514 generates the final output page either in HTML or XHTML format that can be rendered on a user device. In an embodiment of the present invention, the data transformer 514 returns output page to the response handler 510. The response handler 510 thereby returns the output page to the controller 506 and the controller 506 returns the output page to the device requesting the web-based application.

Figure 6:
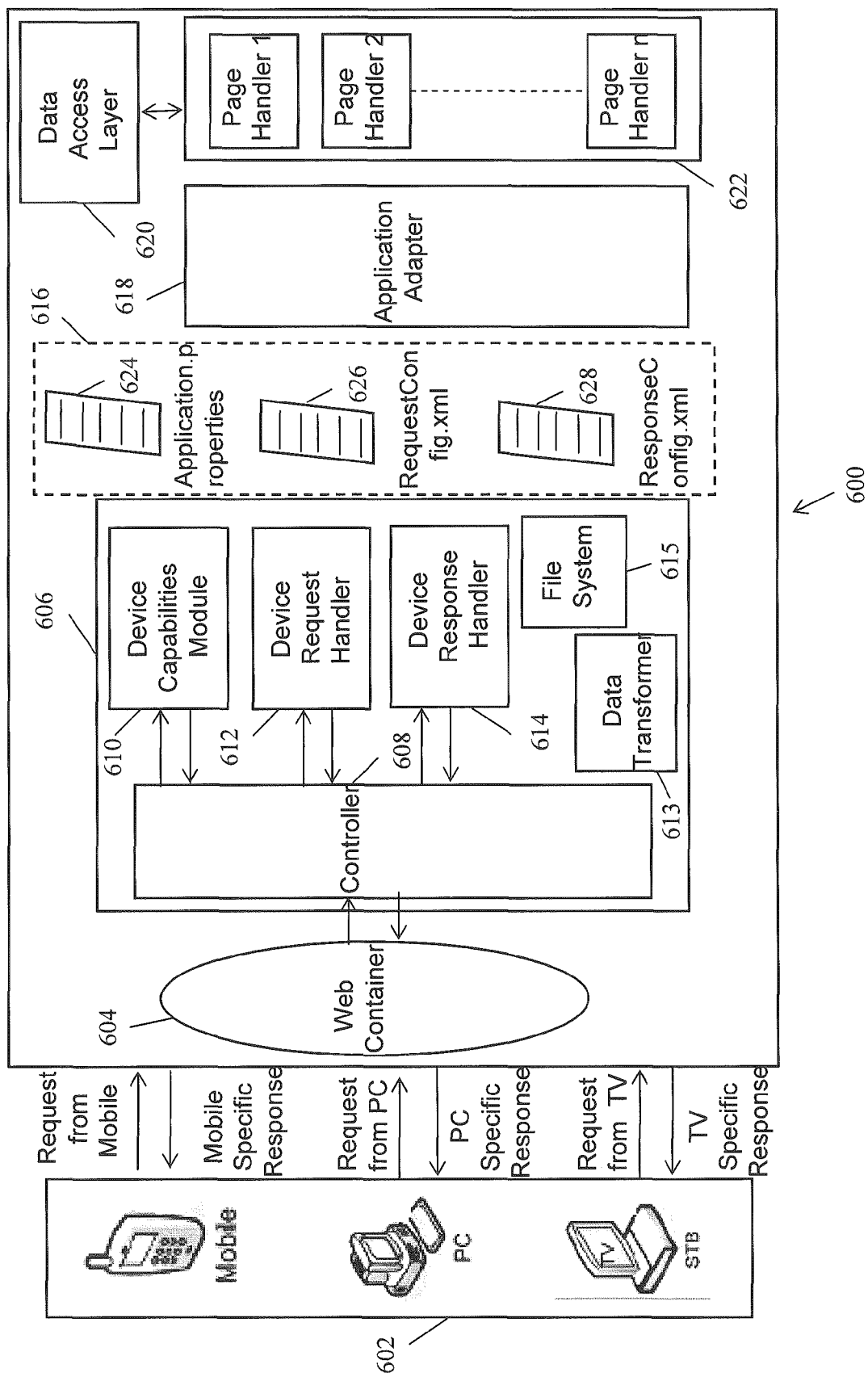
FIG. 6 illustrates a logical architecture of a system for providing applications to devices, in accordance with another embodiment of the present invention.

FIG. 6 illustrates a logical architecture of a system 600 for providing applications to devices, in accordance with another embodiment of the present invention. The system 600 comprises the following components for providing the applications to devices in a device hosting module 602: a web container 604, a multichannel rendering framework 606, a set of configuration files 616. The set of configuration files includes the files application.properties 624, requestconfig.xml 626 and responseconfig.xml 628. Further, the system 600 comprises an application adapter 618, data access layer 620 and page handlers 622. In an embodiment of the present invention, the device hosting module 602 is connected to the system 600 through a data network (FIG. 1), as described in conjunction with the description of FIG. 1. As shown in FIG. 6, the device hosting module 602 may include devices such as, a mobile phone, a personal computer, a television, and the like. In an embodiment of the present invention, a device, such as a mobile phone may request access to an application in the data network (FIG. 1). In another embodiment of the present invention, device such as television may request for an access to mobile application or web application. In yet another embodiment of the present invention, a personal computer or laptop may request for an access to a mobile application or a television application. The web container 604 is configured to receive application request from a user of a device in the device hosting module 602. The web container 604 is a component of a web server that provides a runtime environment for a web application, such as, a request from one of the devices in the device hosting module 602. Examples of a web container include a platform for delivering server-side software applications and web services, a server designed to serve medium business applications. In an embodiment of the present invention, the system 600 is a web server that services web requests from the device hosting module 602. The multichannel rendering framework 606 comprises a controller 608, a device capabilities module 610, a device request handler 612 and a device response handler 614. The controller 608 is a servlet configured to read configuration files for configuring the requested application in accordance with requirements of requesting device. Further, the controller 608 extracts the "user agent" from the received request in order to identify the application and parameters of the device requesting the application.

The controller 608 then contacts the device capabilities module 610 which is configured to obtain device capabilities information and render Extensible Stylesheet Language (XSL) plug-ins and Cascading Style Sheet (CSS) sheets for the requesting device. Further, based on the device capabilities information received, the device capabilities module 610 is responsible for setting the height and width parameters of the requesting device and sending this information to the controller 608.

In various embodiments of the present invention, the device request handler 612 is configured to identify the requested applications' Adapter class to be invoked from the configuration file: application.properties 624. The device request handler 612 is further configured to obtain page entry details from the configuration file: requestconfig.xml 626. The device request handler 612 is further configured to call the application's Adapter class by passing the page entry details. The device response handler 614 is configured to extract response entries for pagination details by reading the configuration file: responseconfig.xml 628. The system 600 further includes page handlers 622 that are used to construct Extensible Markup Language (XML) structure of pages corresponding to the requested application. The system 600 further interacts with a Media Transformation Engine (MTE) (not shown in the figure) for extracting media corresponding to a requested application. In various embodiments of the present invention, a page handler corresponding to a requested application contacts the MTE by passing parameters such as user identifier (userid), product identifier (product_id), type of device (deviceType) and entitlement identifier (entitlementid).

In various embodiments of the present invention, the multichannel rendering framework 606 further comprises a data transformer 613 and a file system 615. The data transformer 613 is configured to receive final XML-structured page of the requested application, the XSL plug-in, and the CSS style sheet details along with other pagination details from the device response handler 614. Further, the data transformer 613 receives the Extensible Style sheet Language Transformations (XSLT) from the file system 615. The data transformer 613 then transforms the XML from the device request handler 612 using the previously obtained XSL into device-specific 'human readable' document in XHTML format.

Figure 7:
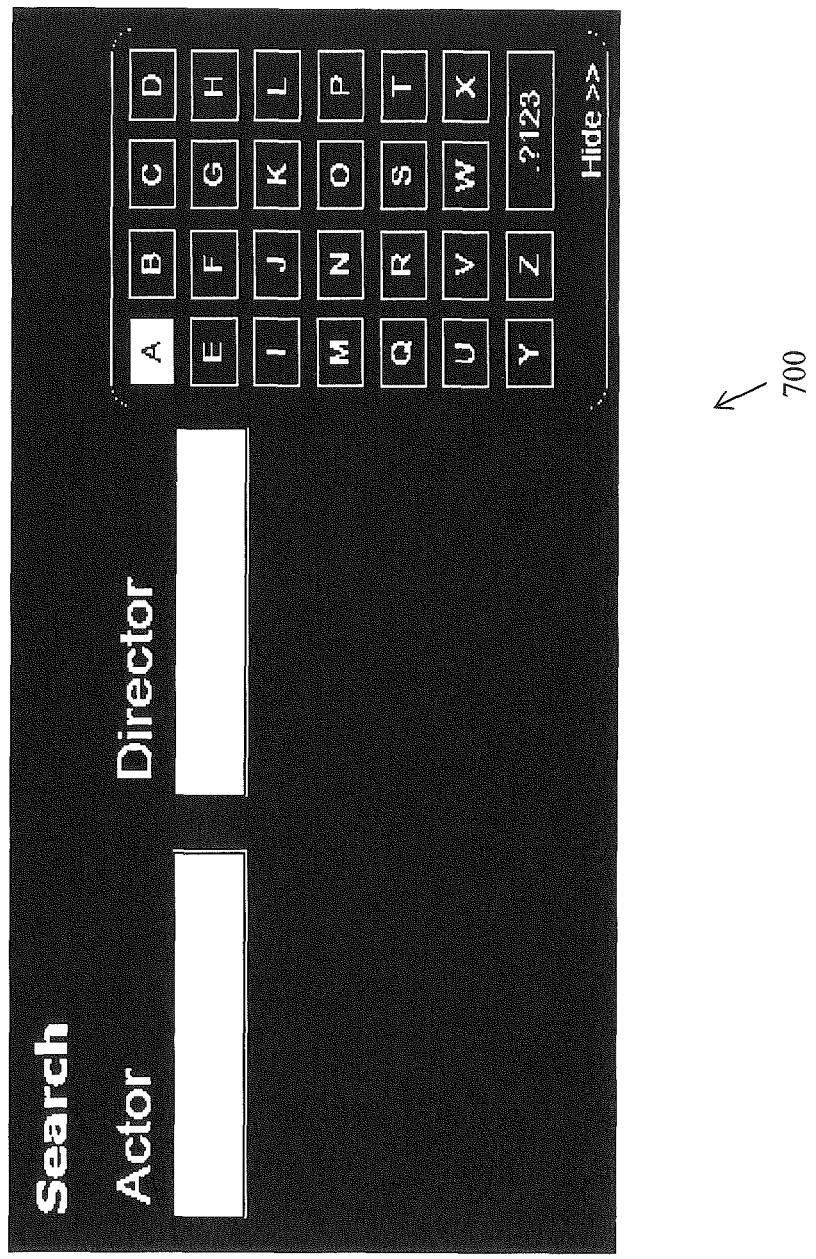
FIG. 7 illustrates screenshot of an interactive video store such as a television.

FIG. 7 illustrates screenshot of an application for performing a search for movie titles. As shown in the figure, the movie search display on a television requires rendering of a virtual keyboard for a user to enter data. In an embodiment of the present invention, the user interface elements required to be displayed include provision for entering data corresponding to the categories "Actor" and "Director" using the virtual keyboard. Further, various embodiments of the invention illustrated in FIGS. 4, 5 and 6 provide for rendering of list of "movie titles" based on input by the user.

Figure 8A:
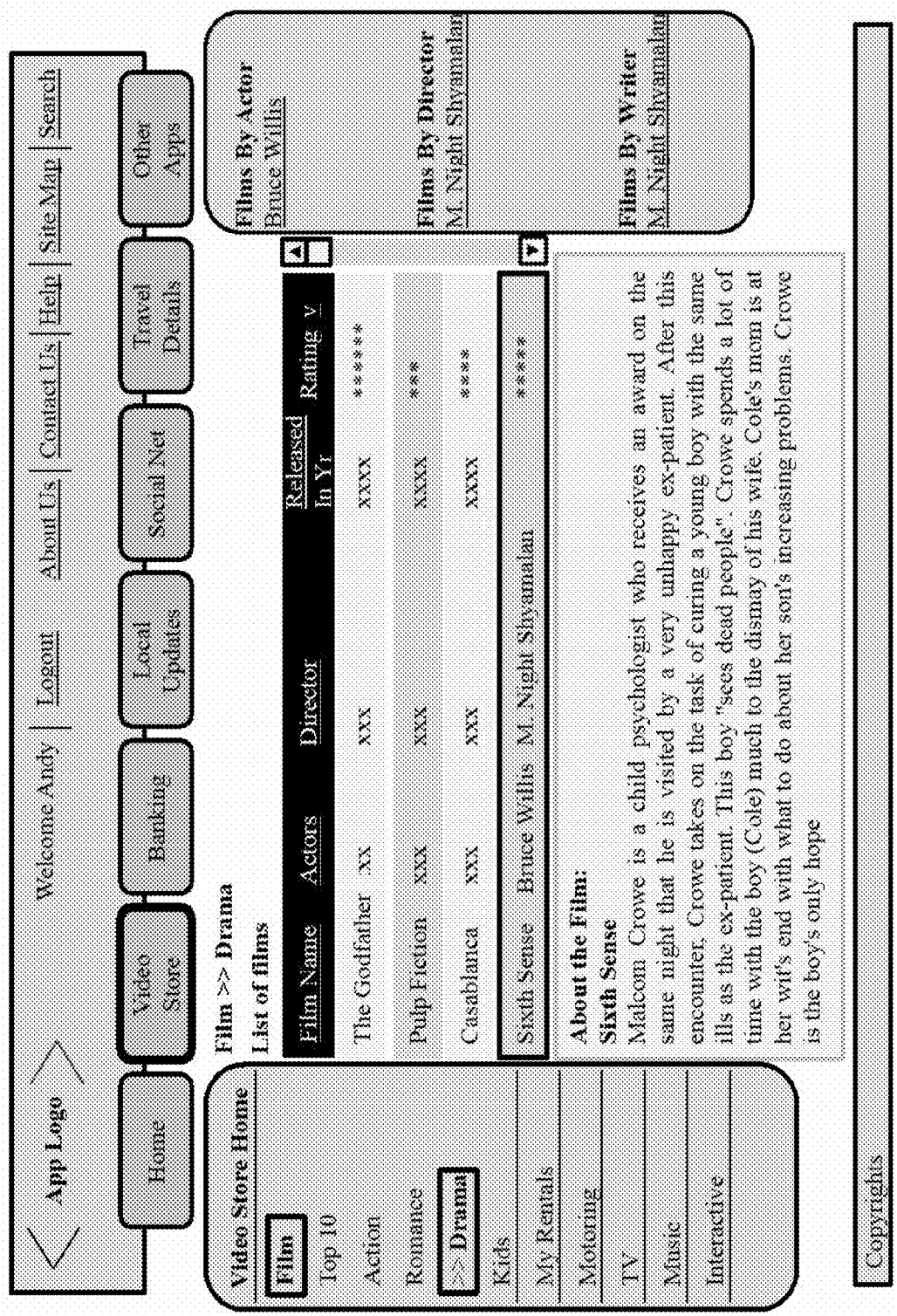
FIGS. 8A and 8B illustrate screenshots of a list of images converted from a list of text for display based on type of device, in accordance with an embodiment of the present invention.
Figure 8B:
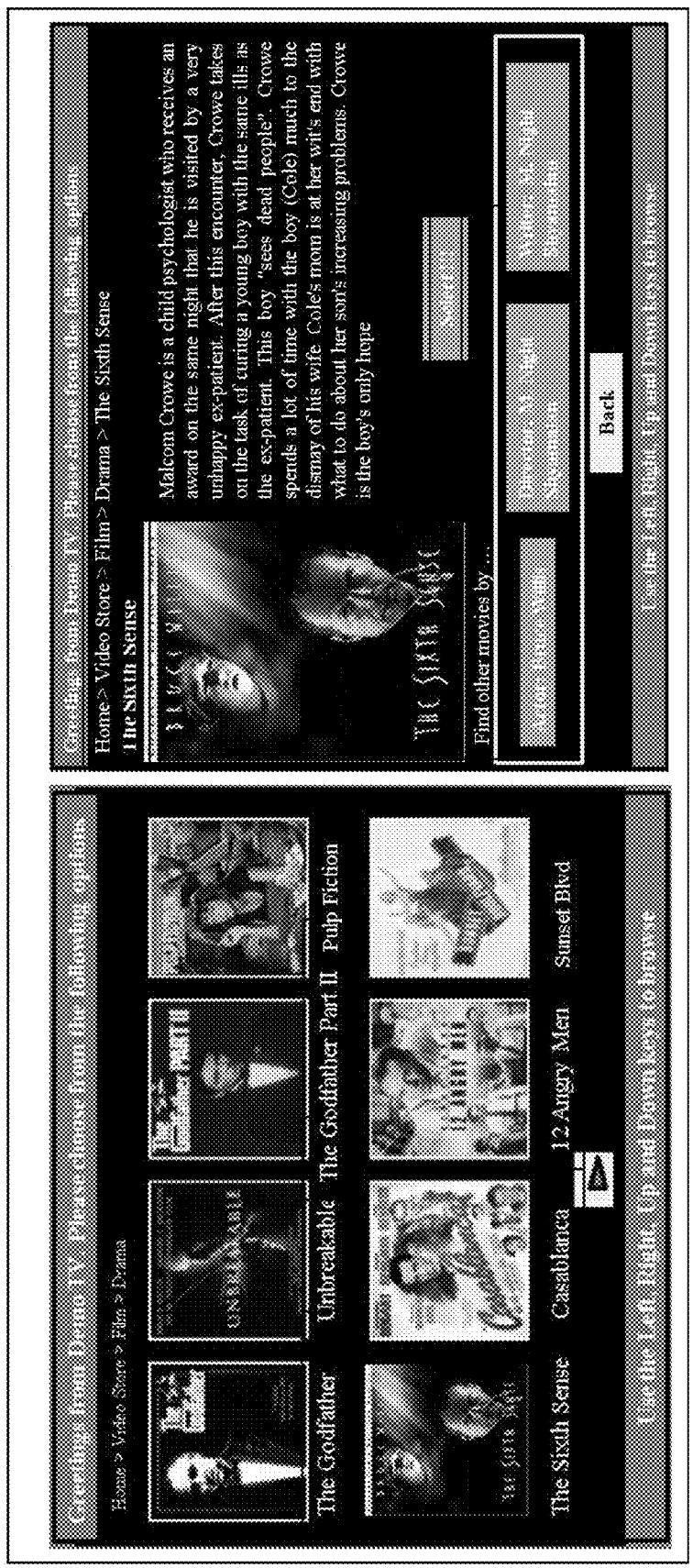

FIGS. 8A and 8B illustrate screenshots of a list of images converted from a list of text for display based on type of device, in accordance with an embodiment of the present invention.

Figure 9:
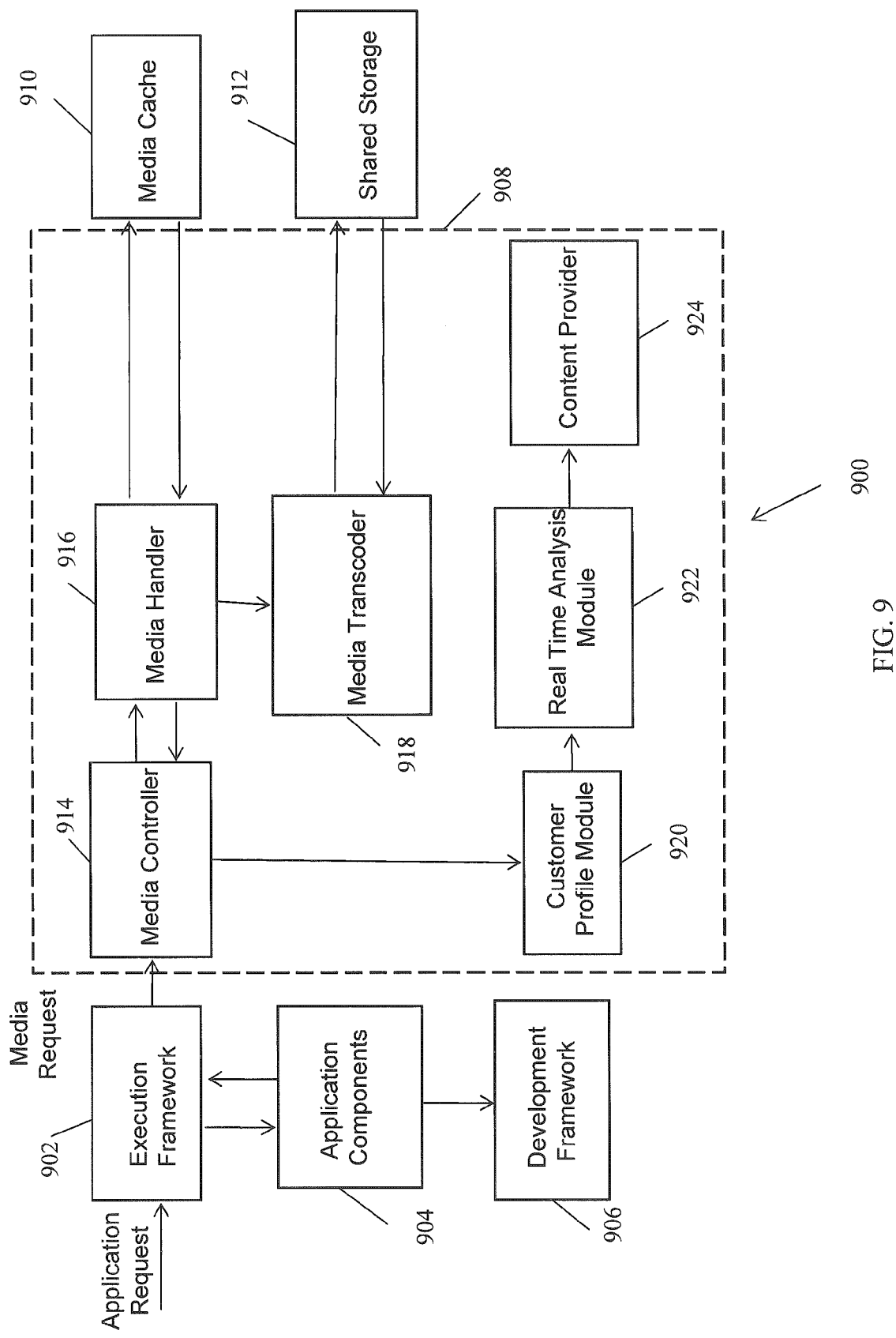
FIG. 9 illustrates an architecture of a media transformation engine providing access to a media request by an application, in accordance with an embodiment of the present invention.

FIG. 9 illustrates an architecture of a media transformation engine 908 providing access to a media request by an application, in accordance with an embodiment of the present invention. The system 900 comprises an execution framework 902, an application components module 904, a development framework 906, a media transformation engine 908, a media cache 910 and a shared storage for transformation 912. The media transformation engine 908 comprises a media controller 914, a media handler 916, a media transcoder 918, a customer profile module 920, a real time analysis module 922, and a content provider 924.

As described in conjunction with the description of FIG. 4, when a request for an application is received from a user by the system for providing applications, the system transforms the navigational and user interface related aspects of the requested application. Referring now to FIG. 9, the execution framework 902 in conjunction with the application components module 904 transforms the navigational and user interface related aspects of the requested web-based application. In an embodiment of the present invention, the execution framework uses templates developed in the development framework 906 for the transformation. The development framework facilitates the user to write a code for a particular application only once for rendering the application on different devices. The user may be a developer or any other person using the development framework. Thus, an application that is written for rendering on a mobile phone, need not be re-written when a request for the same application is made to render on a television This would facilitate the user to focus on implementing functionality efficiently.

In an embodiment of the present invention, the execution framework 902 includes the following components illustrated in FIG. 5: the controller 506, the request handler 508, the response handler 510, the device capabilities module 512 and the data transformer 518.

The development framework comprises the user interface transformer 520 (FIG. 5) and the rules engine 522 (FIG. 5). Further, if the requested web-based application requires provision of transformed media content to the requesting device, the request to access media content is sent to the media transformation engine 908. Examples of content that may require transformation includes, but is not limited to, images, audio, video etc.

The request for media content is sent to the media controller 914. In an embodiment, the request is accompanied by one or more parameters needed to identify the media. The parameters may include device type, bit rate, format etc.

Upon receiving the request for content, the media controller 914 contacts the device capabilities module 512 (FIG. 5) in the execution framework 902 in order to receive capabilities of device requesting the web-based application. In an embodiment of the present invention, the device capabilities module 512 (FIG. 5) queries a device capabilities database (not shown in the figure) for the device type and retrieves the data of media supported by that device. Examples of capabilities of devices include but may not be limited to, screen-size, make of the device, type of browser support, type of security support, keyboard type, bits per pixel, type of operating system, message size limits, version of Mobile Information Device Profile (MIDP).

The media controller 914 then passes the request to the media handler 916. The media handler 916 checks the media cache 910 to see whether a transformed version of the requested content for the type of device requesting the content is available. In various embodiments of the present invention, frequently requested content is transformed in advance and stored in the media cache 910. This is done so that a requested application is delivered in shortest possible time by accessing transformed content from the media cache 910 instead of generating transformed content dynamically in the media transformation engine 908.

The steps for storing frequently requested content in the media cache 910 comprises the initial step of tracking access information. In an embodiment of the present invention, access information being tracked includes, but is not limited to, types of web-based applications accessed, types of content requested etc. Based on requests received by the media controller 914, the customer profile module 920 receives user preferences and usage information. The user preferences and usage information is then passed on to the real time analysis module 922. The real time analysis module 922 analyses the user preferences and constructs content data that is most likely to be requested in near future based on usage pattern. In various embodiments of the present invention, the content data is pre-fetched from the content provider 924 and transformed into most popular device-specific formats. The transformed content elements are then stored in the media cache 910.

In an embodiment of the present invention, if transformed content for a requested application is available in the media cache 910, a Universal Resource Identifier (URI) corresponding to the media content is returned to the media controller 914. The media controller 914 then returns the URI to the requesting application.

In another embodiment of the present invention, if transformed content for a requested application is not available in the media cache 910, the media handler 916 communicates the media transcoder 918. The media transcoder 918 fetches media content from the shared storage 912. Subsequently, the obtained content is then transcoded by the media transcoder 918 into a format requested by the requesting device. The media transcoder 918 then stores the transcoded media content in the media cache 910.

In an embodiment of the present invention, the media handler 916 retrieves URI corresponding to the transcoded media content from the media cache 910 and returns the URI to the media controller 914. The media controller 914 then sends the media content to the requesting application.

Figure 10:
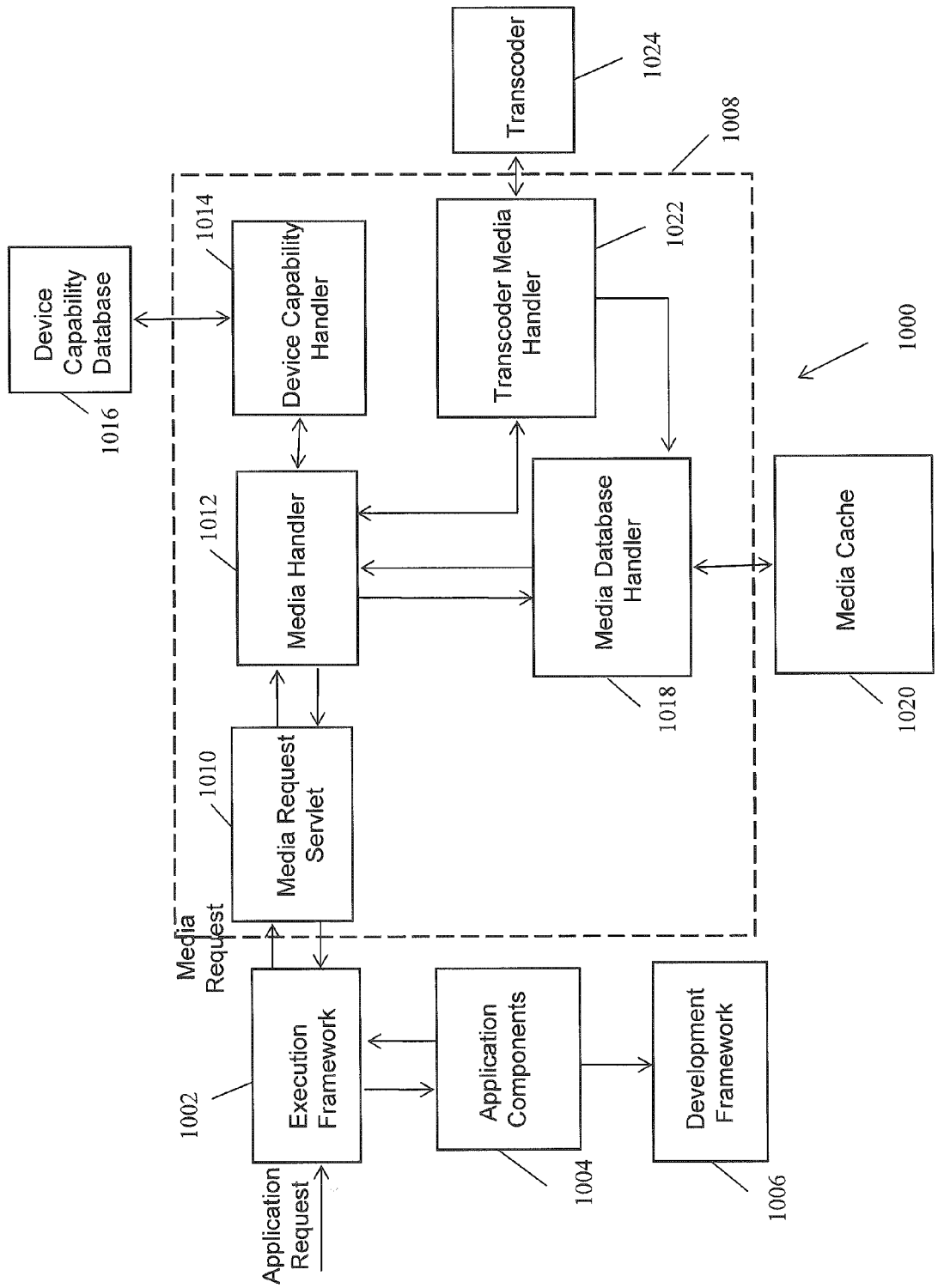
FIG. 10 illustrates an architecture of a media transformation engine providing access to a media request by an application, in accordance with another embodiment of the present invention.

FIG. 10 illustrates an architecture of a media transformation engine 1008 providing access to a media request by an application, in accordance with another embodiment of the present invention. The system 1000 comprises an execution framework 1002, an application components module 1004, a development framework 1006, a media transformation engine 1008, a device capability database 1016, a media cache 1020 and a transcoder 1024. The media transformation engine 1008 comprises a media request servlet 1010, a media handler 1012, a device capability handler 1014, a media database handler 1018 and a transcoder media handler 1022.

As described in conjunction with the description of FIG. 4, when a request for an application is received from a user by the system for providing applications, the system provides the application to the requesting device in accordance with the specifications of the requesting device. In various embodiments of the present invention, if the application requires access to media, the media request is provided to the media transformation engine 1008. The media transformation engine 1008 delivers media in required format specific to the requesting client. In an embodiment of the present invention, depending on the media name and format requested by the client, the media transformation engine 1008 will return appropriate media Uniform Resource Locator (URL) or Video-On-Demand asset ID which may be accessed and played by the client.

In various embodiments of the present invention, the execution framework 1002 sends media request to the media request servlet 1010. The media request servlet 1010 processes the request parameters and passes the details to the media handler 1012. Thereafter, the media handler 1012 checks the request for any missing parameters and forwards the request object to the device capability handler 1014. The device capability handler 1014 in turn queries the device capability database 1016 for the device type and retrieves the data which can be supported by that device. Thereafter, the device capability handler 1014 updates the missing parameters of the request object with the data. The updated request object is then returned to the media handler 1012. The media database handler 1018 is configured to receive the updated request object from the media handler 1012 and for retrieving media from the media cache 1020. The media database handler 1018 searches the requested media in the media cache 1020, and if present then it returns the URL. However, if the requested media is not present in the media cache 1020, then it searches for the media in the file server and sends the response object (containing 'Media URL' or 'VOD Asset ID') back to the Media Handler 1012.

In an embodiment of the present invention, if the media in the requested format is not available, the Media Handler receives a null response object, and in this case, it gets media URL from Media Cache with the same media name and passes it along with the request object to the Transcoder Media Handler 1022. The Transcoder Media Handler 1022 extracts the required parameters from the request object and triggers the transcoder operation through command line. After transcoding is completed, it returns the media response object to the Media Handler 1012. Concurrently, the Transcoder Media Handler 1022 uploads the trancoded media to the Media Cache and updates the database with its properties.

In various embodiments of the present invention, the media transformation engine 1008 supports the following video formats for display on a TV connected to the data network: 1920×1080 [ITU-R BT.709], 1280×720p [ITU-R BT.1543], 720×483 [ITU-R BT.601], 720×576 [ITU-R BT.1358]. In other embodiments of the present invention, the media transformation engine 1008 supports the following audio formats for a TV: 5.1 channel audio, 2 channel audio. In yet other embodiments of the present invention, the media transformation engine 1008 supports the following digital transport streaming formats for display of videos on a TV connected to a data network: H.264 AVC/MPEG4 part 10, MPEG2 [ISO/IEC 13818-2] and VC1 (SMPTE 421M). In yet other embodiments of the present invention, following audio codec's are supported by the media transformation module for a TV: AC3 [Digital Audio Compression (AC-3) ATSC A/52 MPEG-2], AAC [ISO/IEC13818-7], MPEG-4 AAC [ISO/IEC14496-3], MPEG-2 Audio BC [ISO/IEC 13818-3], MP3 file.

In an embodiment of the present invention, a mobile phone should be able to support at least one of the following formats to receive content from the media transformation engine 1008: MPEG-4 AAC Profile Level 2, MPEG-4 HE AAC Profile Level 3.

In another embodiment of the present invention, a mobile phone should be able to support the content type "video". If the content type "video" is supported, the mobile phone should support: Decoding of ITU-T Recommendation H.263 profile 0 level 45. In an example, the mobile should also be able to support decoding of at least one of the following: MPEG-4 Visual Simple Profile Level 0b, H.264 Baseline Profile Level 1 b with constraint_setl_flag=1 and decoding of H.263 Profile 3 Level 45.

Figure 11:
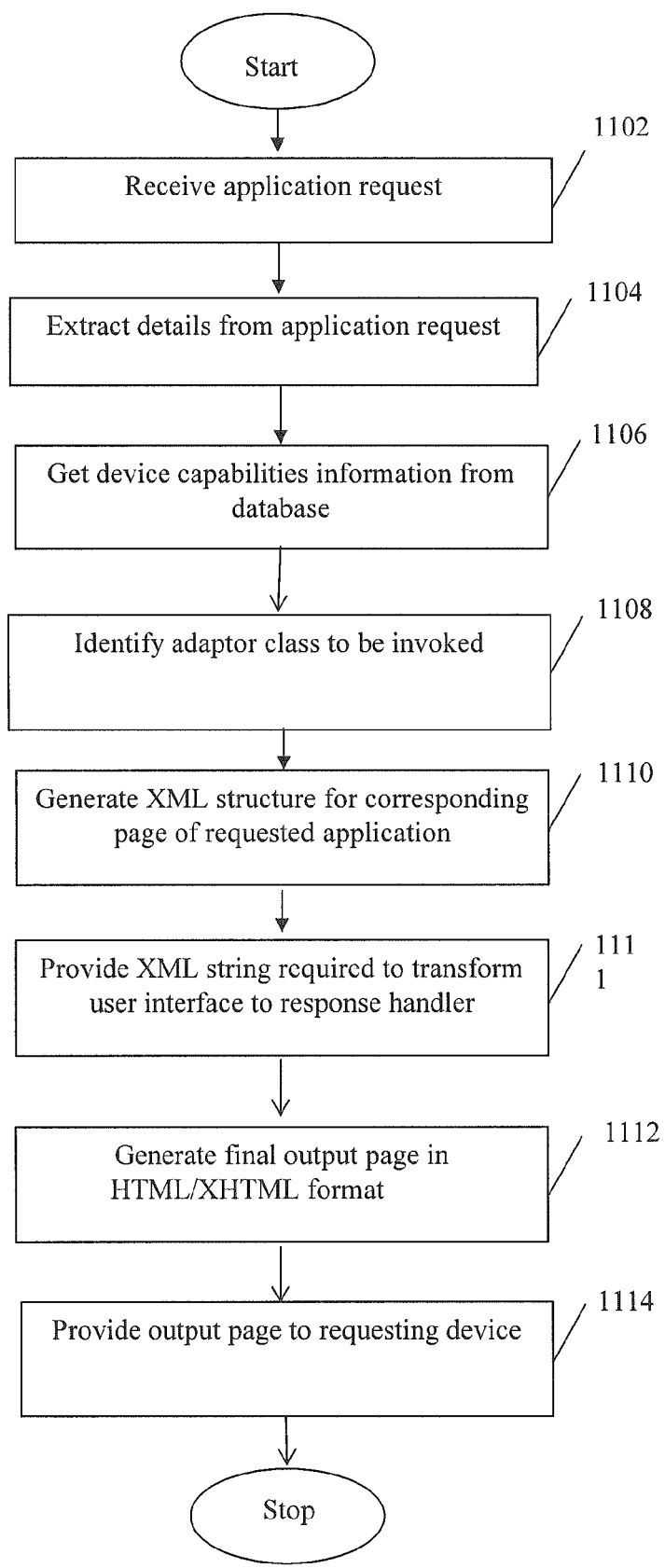
FIG. 11 illustrates a flowchart for providing navigational and user interface related aspects of a requested application, in accordance with an embodiment of the present invention.

FIG. 11 illustrates a flowchart for providing navigational and user interface related aspects of a requested application. At step 1102, a request for an application is received by the system for providing applications. In an embodiment of the present invention, a user accesses a web-based application by entering a URL into a browser in the requesting device. The request is received by a web/application server that is front ending the application environment of the system. The web/application server passes the request to a controller component. At step 1104, necessary details from the application request are extracted by the controller and the device capabilities component is contacted. At step 1106, the device capabilities component gets device capabilities information from a database and sends it back to the controller. The controller thereafter calls request handler component and passes the application request information to the request handler component. At step 1108, the request handler uses application adaptor component to identify an adaptor class to be invoked and then instantiates the class.

At step 1110, an XML structure for corresponding page of requested application is generated. In an embodiment of the present invention, the application adaptor component invokes respective page handlers to generate XML structure for corresponding page. In an embodiment of the present invention, page handlers contact business logic layer to get information required to be embedded in a page.

At step 1112, an XML string required to transform user interface is provided to response handler. In an embodiment of the present invention, the application adaptor component generates the XML string and sends it to the request handler component. Thereafter, the request handler returns the string to the controller which passes the raw string along with details required to transform user interface to response handler component. In an embodiment, the details include style sheets, transformation logic etc. In an example, if the request contains a request for a media component, the request handler gets the media's URL from Media Transformation Engine (MTE) component and embeds the URL in the response XML sent to response handler.

At step 1114, a final output page is generated in HTML/XHTML format. In an embodiment of the present invention, the response handler passes information required to transform user interface to data transformer component. The data transformer then generates the final output page in HTML/XHTML format that can be rendered on a user device.

At step 1116, the final output page is provided to the requesting device. In an embodiment of the present invention, the data transformer returns output page to response handler. The response handler returns the page to the controller that provides the page to the requesting device.

Figure 12:
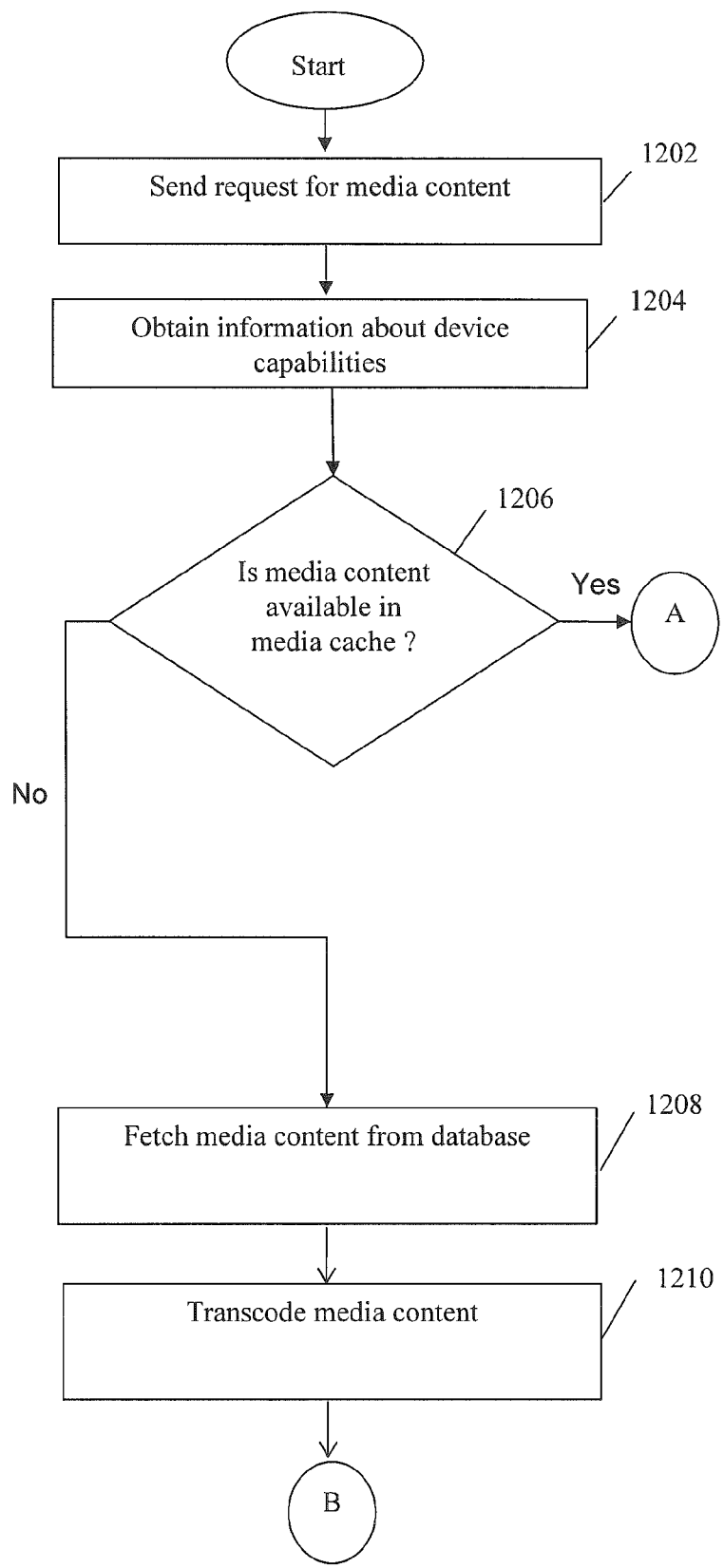
FIGS. 12 and 13 illustrate a flowchart for providing media content in a device compatible format to a requesting application.
Figure 13:
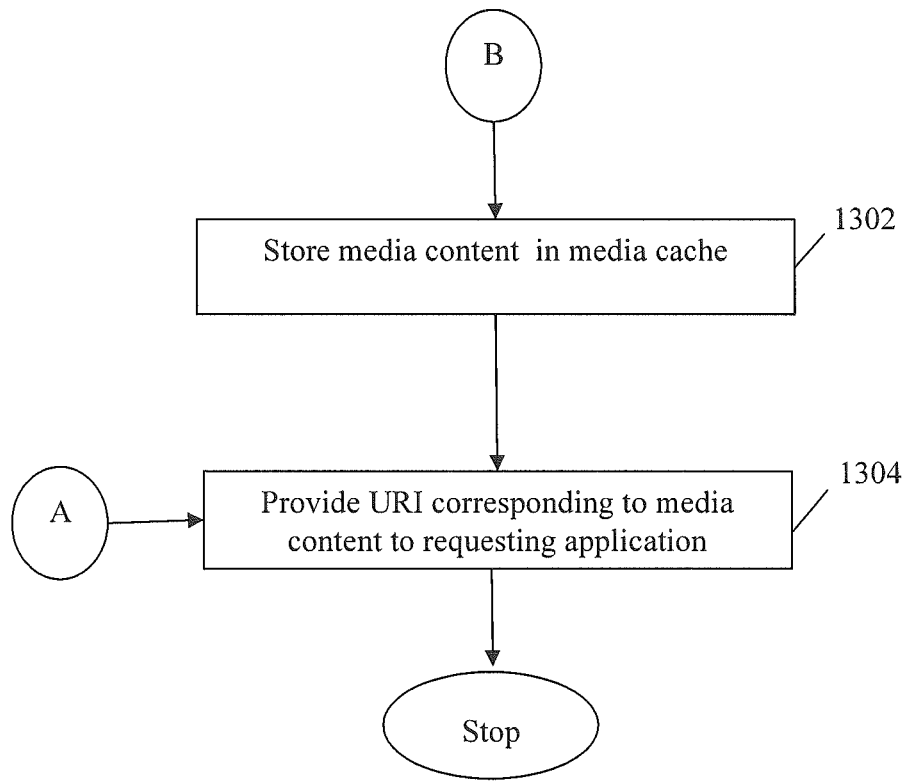

FIGS. 12 and 13 illustrates a flowchart for providing media content in a device compatible format to a requesting application. At step 1202, an application sends a request for media content. In an embodiment of the present invention, the request is accompanied by one or more parameters needed to identify the media. At step 1204, information about capabilities of requesting device is obtained. In an embodiment of the present invention, a media controller contacts a device capabilities module to get capabilities of device requesting the web-based application. In an example, capabilities of a device include capabilities related to screen size of the device, processing speed of the device etc.

At step 1206, it is checked whether the requested media content is available in the media cache. In an embodiment of the present invention, the media controller passes the request for media content to the media handler. The media handler checks the media cache to see whether a transformed version of the requested content for the type of device requesting the content is available. At step 1304, if the requested media content is available in the media cache, a Universal Resource Identifier (URI) corresponding to the media is returned to media controller. The media controller then returns the URI to the requesting application.

At step 1208, if the requested media content is not available in the media cache, the media content is fetched from a shared storage database by the media transcoder. Thereafter, at step 1210, the fetched media content is transcoded according to the format of the requesting device by the media transcoder.

At step 1302, the fetched media content is stored in the media cache by the media transcoder. Subsequently, the media transcoder informs media handler that required media content is available in the media cache database. At step 1304, the URI corresponding to the media content is provided to the media controller and the media controller provides the URI to the requesting device.

Figure 14:
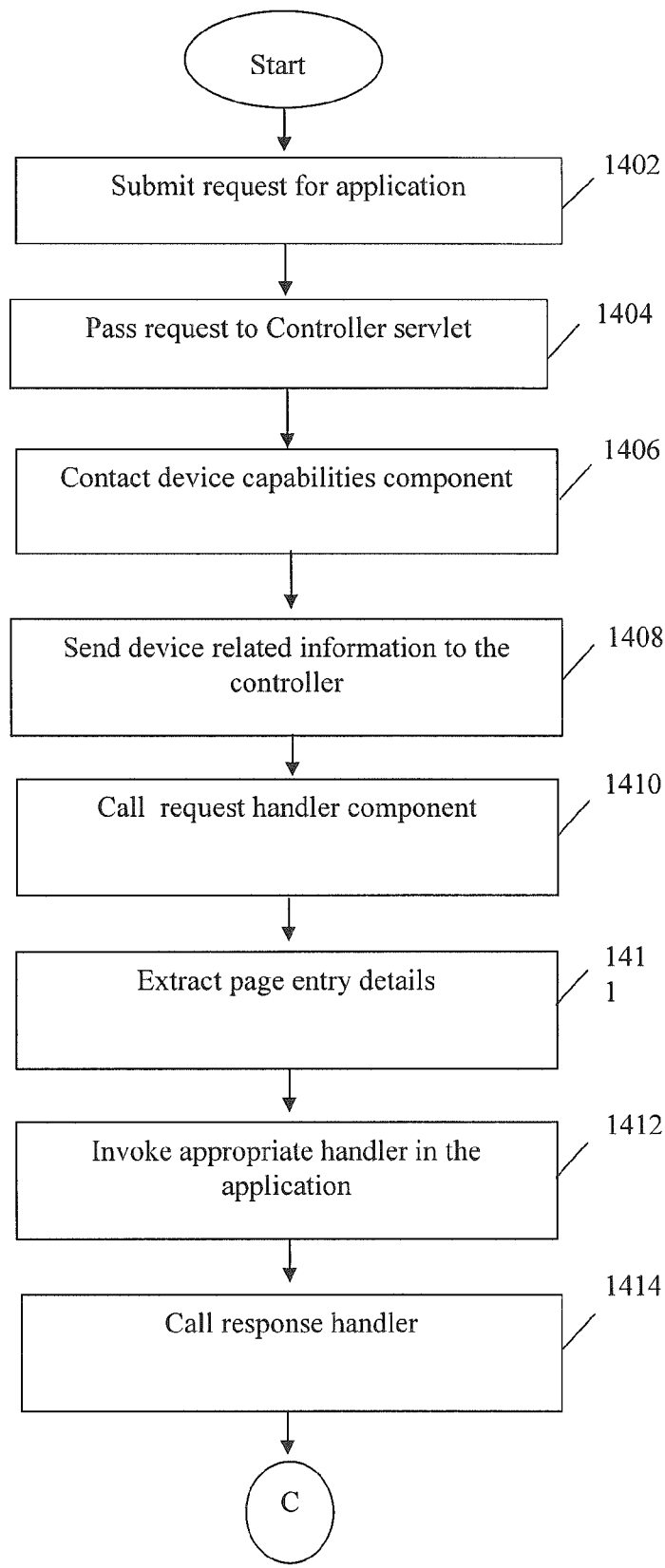
FIGS. 14 and 15 illustrate a flowchart for providing an application to a requesting device, in accordance with an embodiment of the present invention.
Figure 15:
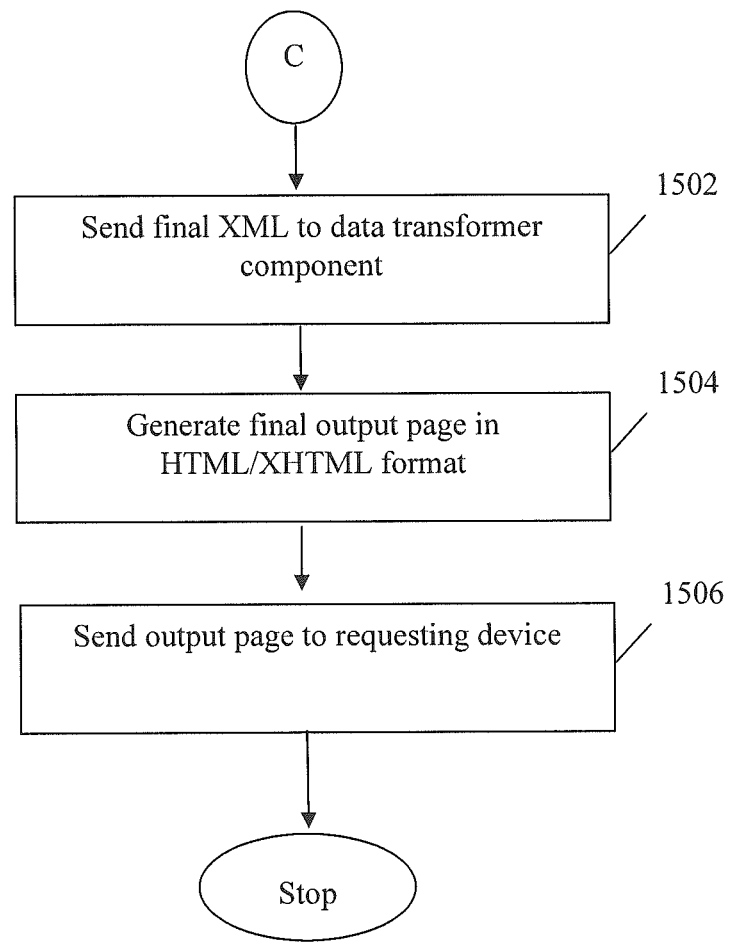

FIG. 14 illustrates a flowchart for providing an application to a requesting device, in accordance with an embodiment of the present invention. In various embodiments of the present invention, a requested application is configured according to the device requesting the application. Examples of applications may be a video store application, a social networking application, a gaming application and the like.

At step 1402, a request for the application is submitted by a user. In an example, a user may submit an application request by entering the Uniform Resource Locator (URL) into a browser. The request may be received by a web server, specifically by a web container of the server. At step 1404, the server reads the "web.xml" file of the application and passes the request to a Controller servlet. In an embodiment of the present invention, the Controller servlet is configured in the application's "web.xml" file. The Controller servlet reads one or more configuration files and keeps them in its cache as key/value pairs for later use. In an example, the configuration files comprise data required for invoking the requested application's Adapter class. In another example, the application files may be at least one of application.properties file and deviceException.properties file. In an embodiment of the present invention, the application.properties file is used to set properties associated with a particular application.

At step 1406, the controller extracts the user agent and other necessary parameters from the request received and it contacts the "Device Capabilities" component. Thereafter, the "Device Capabilities" component queries a database accessed by the "Device Capabilities" component. In an embodiment of the present invention, at step 1408, the "Device Capabilities" component gets information about capabilities of the requesting device and sends the device related information back to the controller.

At step 1410, the controller calls "Request Handler" component and passes request information to the component. In an embodiment of the present invention, the "Request Handler" component identifies the application's Adapter class to be invoked by reading the application.properties file and it instantiates this application's Adapter class. Further, the "Request Handler" component reads header & footer files information from application.properties file and keeps the information in its cache. The request handler then passes the information to the controller.

In various embodiments of the present invention, at step 1411, the "Request Handler" component reads the configuration file: RequestConfig.xml and using the page name that it received from the Controller, it extracts corresponding page entry details i.e URL and parameter values. At step 1412, based on the URL and parameter values received from the "Request Handler" component, the Adapter class invokes appropriate Handler in the application. In an example, if the application request submitted by the user, at step 1402 includes request for playing a media file, such as a video file, the handler invoked by the Adapter class will contact the Media Transformation Engine (MTE) component by passing userid, productid, deviceType and entitlementid parameters. In an embodiment of the present invention, if the request is from Mobile and PC users, then based on the parameters it received, MTE queries its database to see if the requested media is available in the specified format. However, if the requested media is not available in the specified format, the MTE transcodes the media to the desired format dynamically and returns the URL to Mobile and PC users. In another embodiment of the present invention, if the request is from IPTV, then the MTE will query the database and return the Video-On-Demand asset identifier.

Subsequently, at step 1414, the controller calls response handler by passing raw Extensible Markup Language (XML) string, header and footer files information from application-.properties file along with Extensible Stylesheet Language (XSL) plug-in and Cascading Style Sheets (CSS) details. Then the response handler extracts response entries for pagination details by reading ResponseConfig.xml file. In an embodiment of the present invention, the ResponseConfig.xml is an XML file containing page details for which pagination is required. Pagination is a concept used if there is a limit on no items to be displayed, in limited no of rows, per page. For example, say, if the no of rows to be displayed in a particular page is 3 and there are 15 items in that page. In this case, if pagination technique is used, 3 items in 3 rows per page will be displayed, and in an exemplary embodiment at the bottom of the first page, <next> page (with page number) hyperlinks will be activated. And in the subsequent pages, <prey> 12 <next> links will be activated.

At step 1502, the response handler sends final XML, XSL plug-in and CSS style sheet details along with pagination details to Data Transformer component. Thereafter, at step 1504, the Data Transformer component generates final output page either in HTML or XHTML format to be displayed on user interface of the device. Finally, at step 1506 the final output page is sent to the requesting device.

Figure 16:
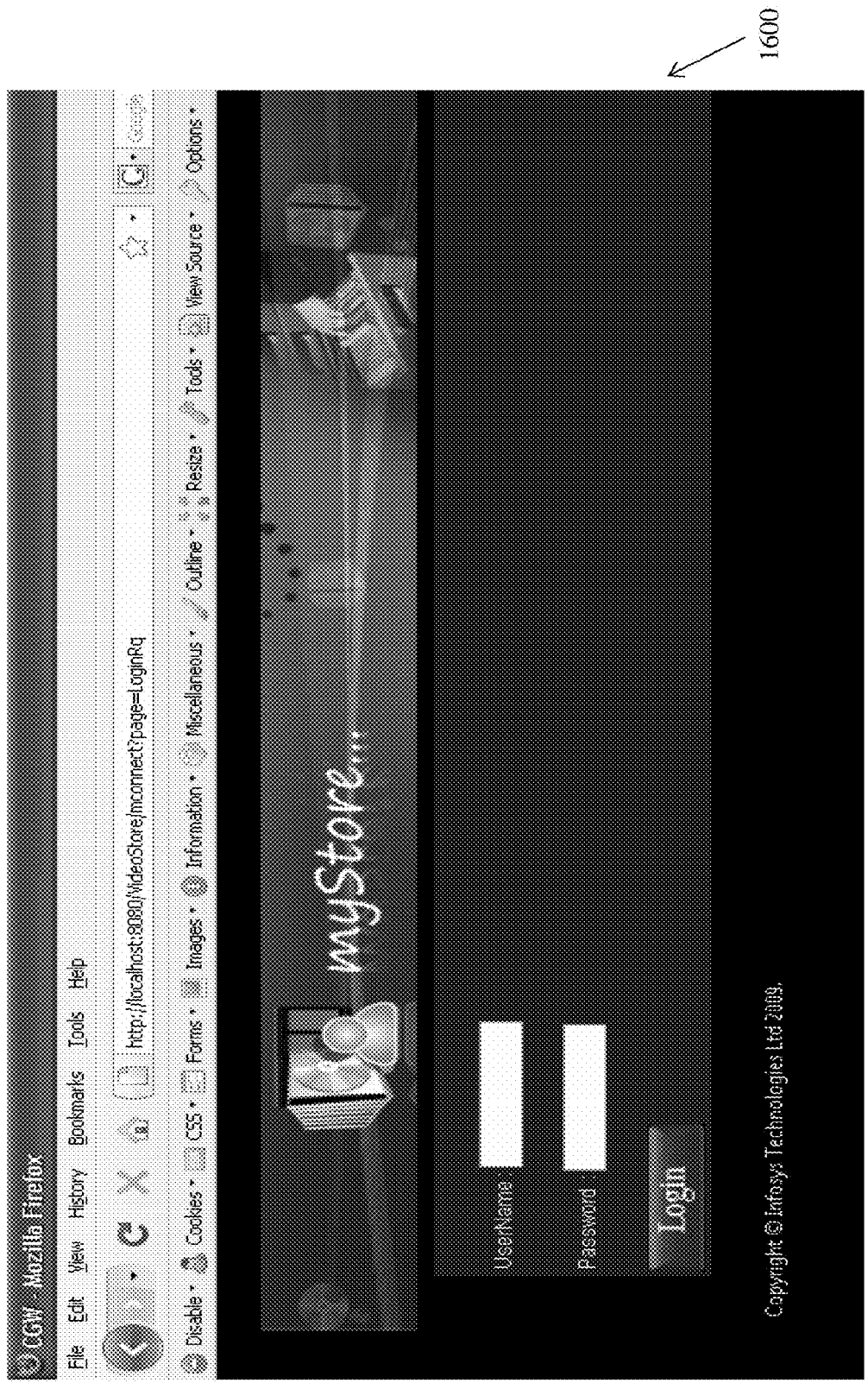
FIGS. 16, 17 and 18 illustrate screenshots displaying application login screens of a sample "Video Store" application rendered on the screens of a personal computer, a television and a mobile device respectively.
Figure 17:
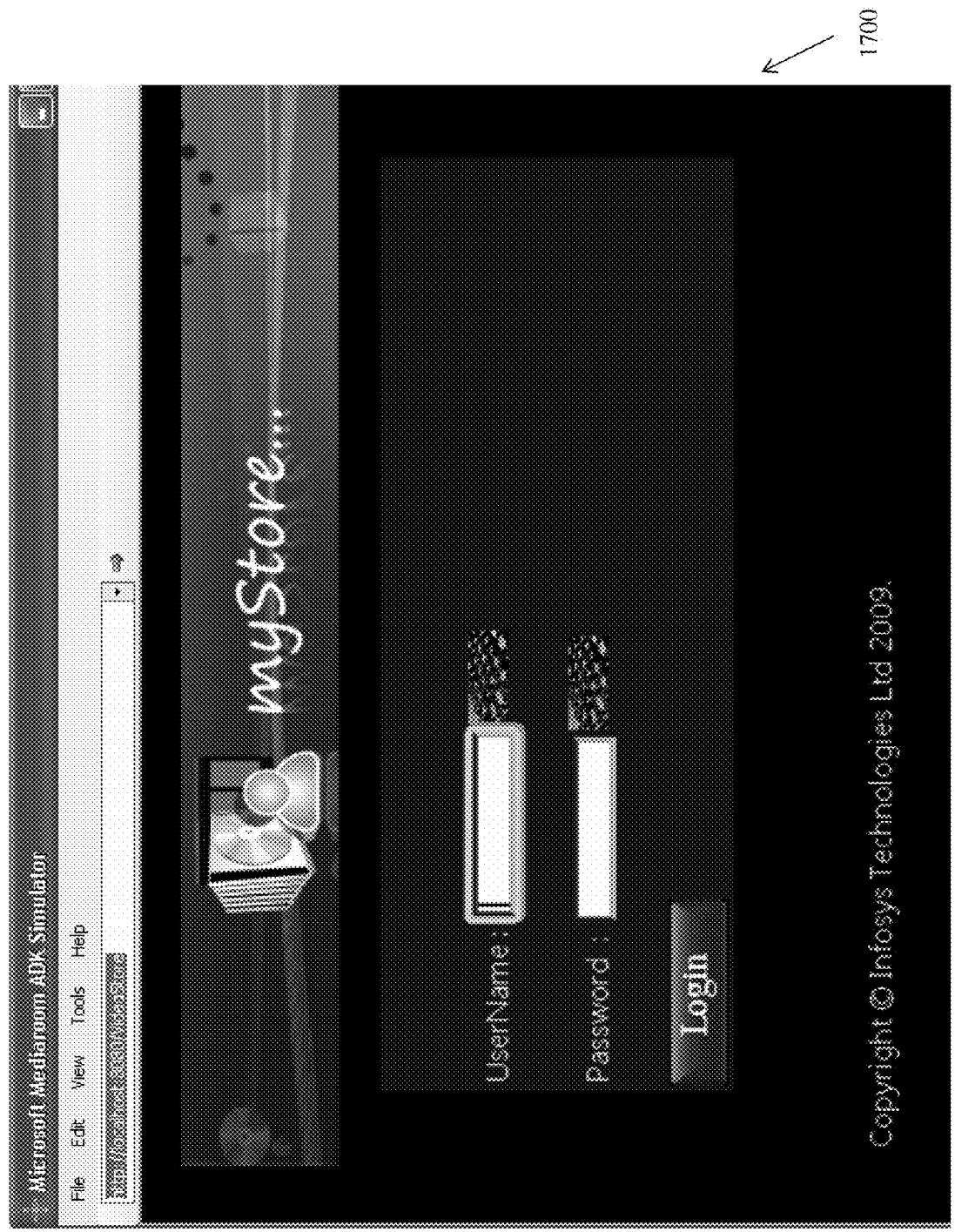
Figure 18:
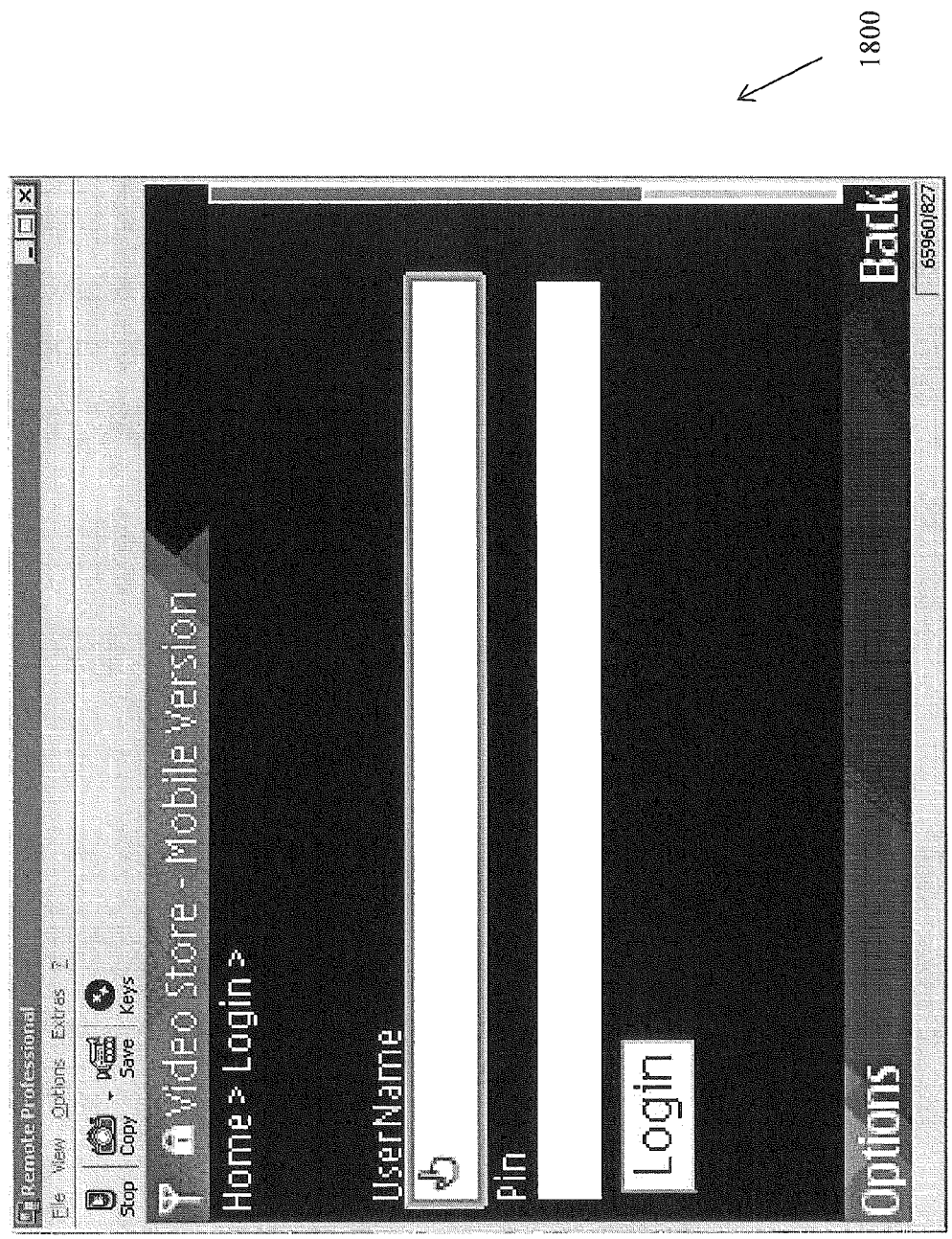

FIGS. 16, 17 and 18 illustrate screen shots displaying application login screens of a sample "Video Store" application rendered on the screens of a personal computer, a television and a mobile device respectively. FIG. 16 illustrates application login screen for a "Video Store" application. In an example, the "Video Store" application is an application which facilitates the end user for easy browsing, viewing and buying of available content/products (video content) and presents the content in an intuitive manner to the user based on his/her entitlement to that product. As shown in FIG. 16, the "application login" page is displayed onto the "Mozilla Firefox" browser of a computer according to the specifications of the browser. In FIG. 17, the "application login" is rendered on "Microsoft Mediaroom ADK simulator" which is an Internet Protocol Television (IPTV) platform software used in providing digital television service through Internet Protocols. Further, FIG. 18 illustrates an "application login" display rendered onto the screen of a mobile device.

Figure 19:
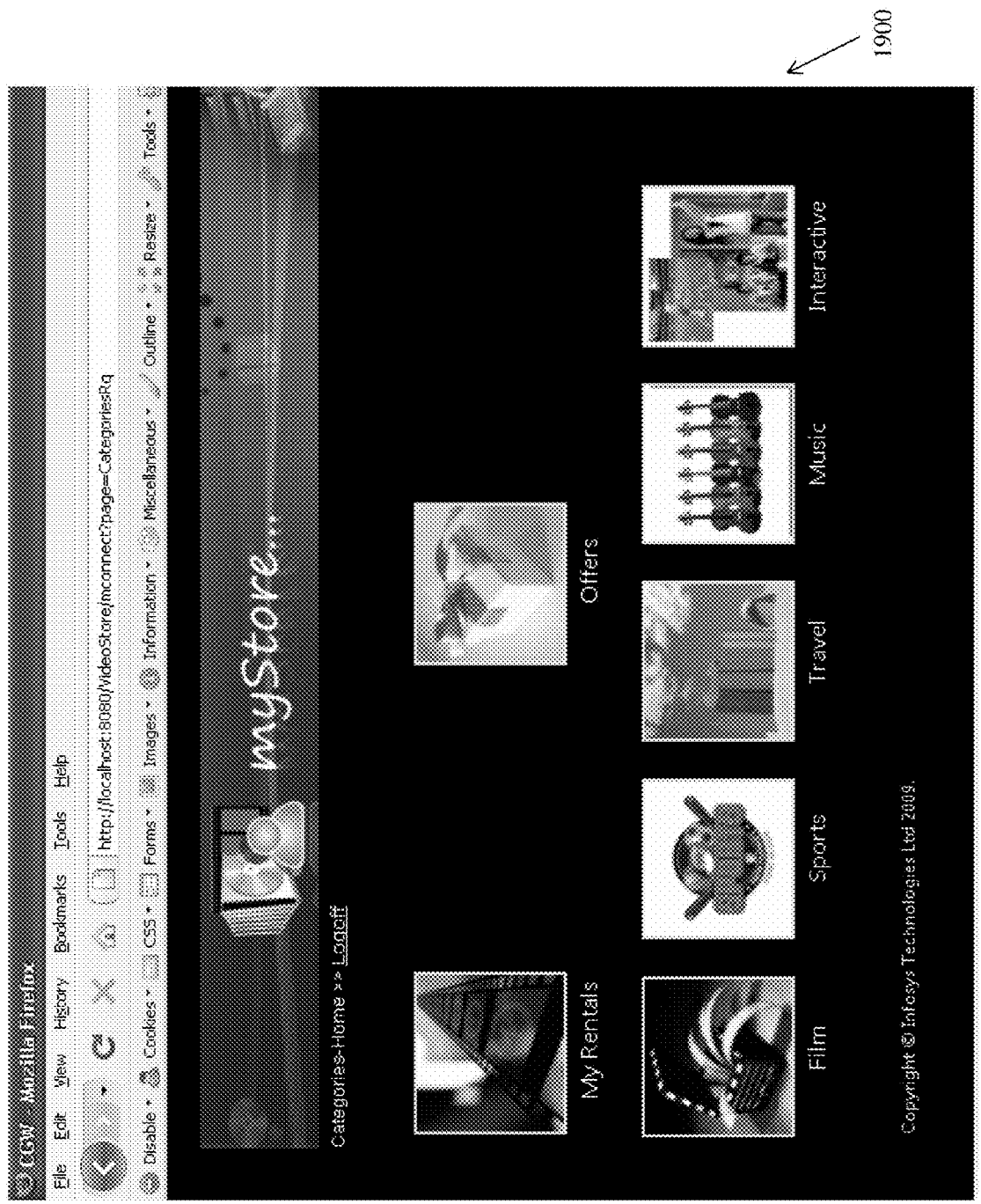
FIGS. 19, 20 and 21 illustrate screenshots displaying categories page of "Video Store" application rendered on the screens of a personal computer, a television and a mobile device respectively.
Figure 20:
Figure 21:
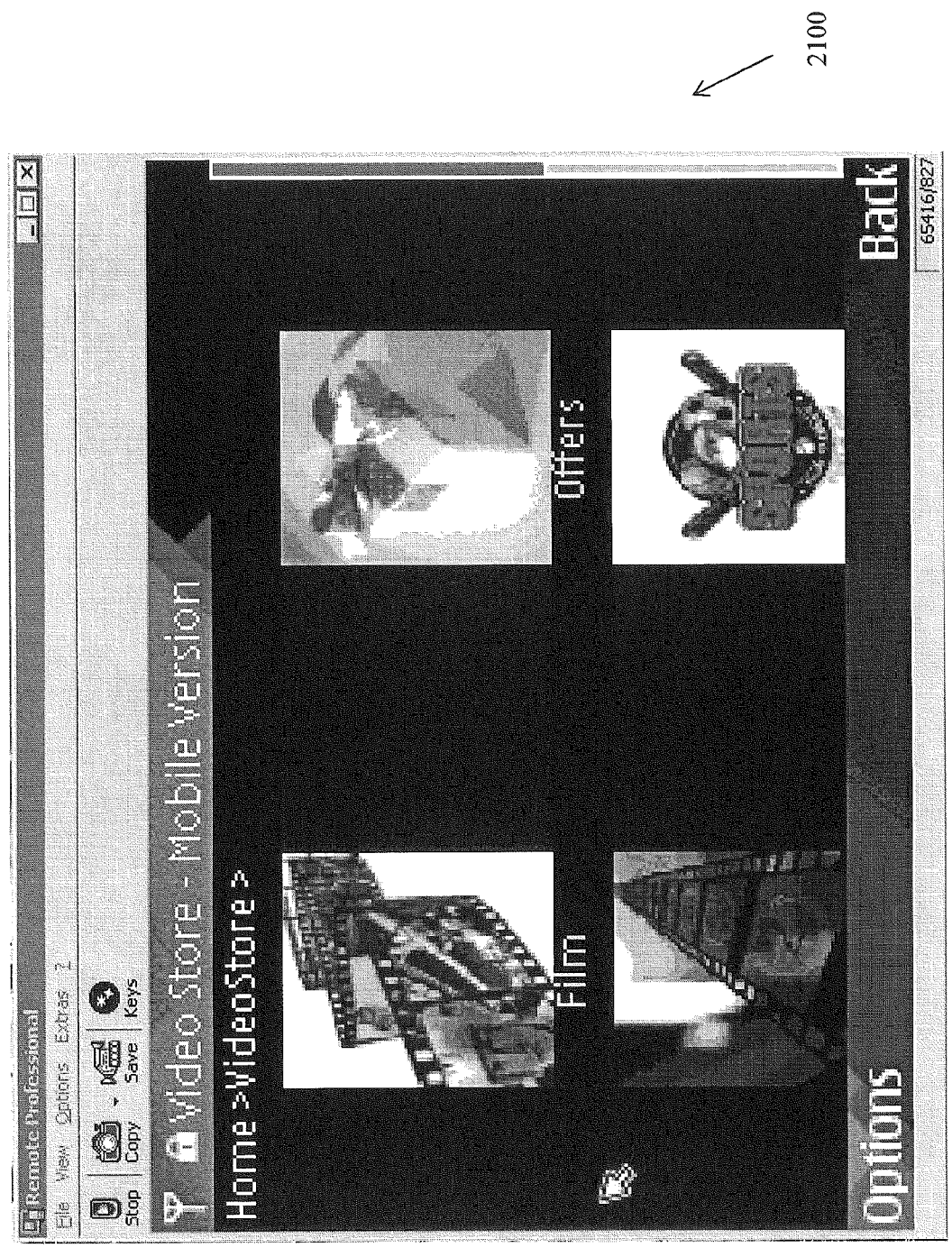

FIGS. 19, 20 and 21 illustrate screen shots displaying "categories page" of "Video Store" application rendered on user interfaces of a personal computer, a television and a mobile device respectively. As shown in FIG. 19, clickable icons corresponding to categories, such as, "My Rentals", "Offers", "Film", "Sports" etc. are displayed on the user interface screen rendering of a computer. Alternatively, in FIG. 20, message prompting a user to press keys for accessing TV menu for selecting a category for a "Video Store" application is displayed on a user interface screen rendering on a television/set-top box. FIG. 20 illustrates a user interface displaying categories corresponding to a "Video Store" application rendered on a mobile device. The user interface shows icons illustrating tasks such as, "Stop", "Copy", "Save" and "Keys".

The method and system of the present invention can be used to provide service providers with fast and efficient ways to build applications for various devices. The system helps service providers to reduce time-to-market by helping service providers quickly develop and deploy applications on different channels. The system helps service providers to reduce time-to-market by helping service providers quickly develop and deploy applications on different channels. Also, costs involved in development and deployment are reduced to a great extent. Further, user characterization can be done efficiently due to a single platform for recording and analysis. Hence, service providers can provide better services to the users.

The system provides users with a transformation in the user interface and navigation of the applications to suit the device used to access the application. This eases out the efforts that users had to put in earlier systems to scroll the page of the application and enter keywords/strings in the application. Further, the most popular content on various applications is converted to formats suitable for various devices and is stored in a media cache. This reduces the workload and time delay in providing users with content on certain popular applications.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A system for providing access to a software application on a television, the system comprising:
   an applications module configured to store one or more software applications associated with mobile phones;
   an execution framework comprising a controller, the execution framework configured to:
      receive a request from the television for an access to the software application associated with a mobile phone, wherein the request is sent by a subscriber from the television using a virtual QWERTY keyboard displayed on the television;
      extract information related to capabilities of the television from a database, wherein the capabilities comprise: aspect ratio, display resolution, media player, and a browser associated with the television;
      determine personalization level of a user interface of the requested software application for the subscriber, wherein the personalization level is determined by:
         analyzing one or more activities performed by the subscriber, for a predefined interval of time, on the television, the one or more activities are associated with one or more interest areas of the subscriber;
         analyzing static information associated with the one or more activities performed by the subscriber, for the predefined interval of time, on the television;
         assigning ranks to the one or more interest areas based on the analysis of the one or more activities performed by the subscriber and the analysis of the static information, wherein a higher rank to an interest area implies a higher personalization level of the subscriber with the interest area; and
         analyzing dynamic information pertaining to each of the one or more activities performed by the subscriber and updating the ranks of the one or more interest areas of the subscriber;

customize the user interface of the software application by incorporating features of the higher rank interest area in the user interface;

transform navigational and user interface related aspects of the requested software application associated with the mobile phone to make the software application compliant with the capabilities of the television; and provide the software application with the customized user interface to the television, wherein the customized user interface is compliant with the capabilities of the television and has the higher personalization level for the subscriber, the customized user interface facilitates the subscriber to access, on the television, information related to the higher rank interest area with minimal browsing.

2. The system of claim 1, wherein the one or more software applications comprises at least one of a banking application, a gaming application and an e-commerce application, an entertainment application, a dating application, and any other appropriate application.

3. The system of claim 1, wherein the controller is configured to read configuration files for configuring the software application in accordance with requirements of the one or more requesting devices and transfer data between one or more modules of the system, the controller further comprising:

a device capabilities module configured to obtain device capabilities information and render XSL plug-ins and CSS sheets for the one or more requesting devices;

a device request handler configured to identify the software Applications' Adapter class to be invoked from a configuration file and further configured to instantiate the Adapter class;

a device response handler configured to receive XML structure of an output page in string format;

a data transformer configured to receive XML strings and information required to transform user interface from the controller and further configured to generate the output page corresponding to the software application in at least one of an HTML and an XHTML format; and one or more page handlers configured to generate XML structure for corresponding pages of the software application.

4. The system of claim 3, further comprising a web container configured to receive request for a web application and further configured to provide a runtime environment for running the web application.

5. The system of claim 3, further comprising an application programming interface configured to define a set of configuration files, wherein the set of configuration files comprises one or more configuration files for storing the Adapter classes of one or more software applications, storing response entries for pagination details and invoking the page handlers for generating XML structure of corresponding page of the software application.

6. The system of claim 5, wherein the one or more configuration files comprises at least one of application properties file, context information file, request configuration file and response configuration file.

7. The system of claim 5, wherein the software application properties file is configured to store the requested applications' Adapter class.

8. The system of claim 5, wherein the context information file is configured to store application-specific data source information.

9. The system of claim 5, wherein the request configuration file is configured to define each page entry corresponding to the software application along with parameters to be passed along with page request to the software applications' Adapter class.

10. The system of claim 5, wherein the response configuration file is configured to store response entries for pagination details corresponding to the software application.

11. The system of claim 1 further comprises a media transformation engine configured to provide the media content requested by the software application.

12. The system of claim 11, wherein the media transformation engine comprises:

a media request servlet configured to receive media request and process media request parameters;

a media handler configured to receive details of the media request from the media request servlet and check the media request for any missing parameters;

a device capability handler configured to receive the media request from the media handler, to retrieve data of media supported by the one or more requesting devices from a device capability database and further configured to update the missing parameters of the media request with the data;

a device capability database configured to store one or more device types and the data of media supported by the one or more device types;

a media database handler configured to receive updated media request from the media handler and further configured to retrieve media from the media cache, the media cache configured to store frequently requested media;

a transcoder media handler configured to receive media URL from media cache, to extract required parameters from the media request ; and a transcoder configured to transcode media into required format.

13. The system of claim 11, further comprising configuration information having at least one of features compatible with type of the television and information regarding what features should be shown on the television based on capabilities of the television.

14. The system of claim 13, wherein the configuration information is information sent by an application in the applications module in an XML file format to an administrator.

15. The system of claim 13, wherein the configuration information is information recorded and sent by an application owner to an administrator, wherein the administrator manually enters information pertaining to each feature of the software application using the user interface.

16. The system of claim 15, wherein the user interface is used to manage configuration information, further wherein, managing the configuration information comprises importing and exporting information, adding information, viewing, deleting and modifying the configuration information and trigger fetching subscriber usage information.

17. The system of claim 1, wherein the static information comprises at least one of request URL's from a browser on the television and the television channel viewing history.

18. The system of claim 1, wherein the dynamic information comprises information relevant to a request sent by the subscriber that is used for determining the features for rendering the application on the television based on the capabilities of the television.

19. The system of claim 1, wherein the one or more activities performed by the subscriber comprise: watching a sports event video on the television, browsing a food website on the television, watching movies on the television, searching for hotels and travel deals using browser of the television, and reading technology articles using the television.

20. The system of claim 1, wherein the one or more interest areas of the subscriber comprise at least one of: sports, food, travel, movies, and technology.

21. A method for providing access to a software application on a television, the method comprising:
- receiving a request from the television for an access to the software application associated with a mobile phone, wherein the request is sent by a subscriber from the television using a virtual QWERTY keyboard displayed on the television;
- extracting information related to capabilities of the television from a database, wherein the capabilities comprise: aspect ratio, display resolution, media player, and a browser associated with the television;
- determining personalization level of a user interface of the requested software application for the subscriber, wherein the determination of the personalization level comprises:
  - analyzing one or more activities performed by the subscriber, for a predefined interval of time, on the television, the one or more activities are associated with one or more interest areas of the subscriber;
  - analyzing static information associated with the one or more activities performed by the subscriber, for the predefined interval of time, on the television;
  - assigning ranks to the one or more interest areas based on the analysis of the one or more activities performed by the subscriber and the analysis of the static information, wherein a higher rank to an interest area implies a higher personalization level of the subscriber with the interest area; and
  - analyzing dynamic information pertaining to each of the one or more activities performed by the subscriber and updating the ranks of the one or more interest areas of the subscriber;
- customizing the user interface of the software application by incorporating features of the higher rank interest area in the user interface;
- transforming navigational and user interface related aspects of the requested software application associated with the mobile phone to make the software application compliant with the capabilities of the television; and
- providing the software application with the customized user interface to the television, wherein the customized user interface is compliant with the capabilities of the television and has the higher personalization level for the subscriber, the customized user interface facilitates the subscriber to access, on the television, information related to the higher rank interest area with minimal browsing.

* * * * *